United States Patent
Kojima et al.

(10) Patent No.: US 11,541,926 B2
(45) Date of Patent: Jan. 3, 2023

(54) STEERING WHEEL

(71) Applicant: TOYODA GOSEI CO., LTD., Kiyosu (JP)

(72) Inventors: Fumiyasu Kojima, Kiyosu (JP); Kenji Fujimura, Kiyosu (JP); Takanori Yamada, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/460,480

(22) Filed: Aug. 30, 2021

(65) Prior Publication Data
US 2022/0063699 A1 Mar. 3, 2022

(30) Foreign Application Priority Data

Sep. 1, 2020 (JP) ............................. JP2020-146801
Mar. 31, 2021 (JP) ............................. JP2021-058995

(51) Int. Cl.
*B62D 1/06* (2006.01)
*B60Q 3/283* (2017.01)

(52) U.S. Cl.
CPC ............... *B62D 1/06* (2013.01); *B60Q 3/283* (2017.02)

(58) Field of Classification Search
CPC .......... B62D 1/06; B62D 1/065; B62D 1/046; B60Q 1/0082; B60Q 3/283
See application file for complete search history.

(56) References Cited

U.S. PATENT DOCUMENTS

| | | | |
|---|---|---|---|
| 11,130,443 B1* | 9/2021 | Matsu | B60Q 3/62 |
| 11,198,387 B1* | 12/2021 | Matsu | F21V 33/008 |
| 11,267,499 B1* | 3/2022 | Matsu | B60Q 3/70 |
| 11,312,294 B1* | 4/2022 | Matsu | B60K 35/00 |
| 2007/0137413 A1* | 6/2007 | Xu | B60R 13/02 74/552 |
| 2016/0025281 A1* | 1/2016 | Gardner | B62D 1/06 362/520 |
| 2016/0090116 A1* | 3/2016 | Joh | B62D 1/06 74/558 |
| 2018/0043920 A1* | 2/2018 | Fujii | H05B 3/16 |
| 2018/0348392 A1 | 12/2018 | Nishio et al. | |
| 2018/0354543 A1 | 12/2018 | Nishio et al. | |

(Continued)

FOREIGN PATENT DOCUMENTS

| | | |
|---|---|---|
| JP | 2016-68758 A | 5/2016 |
| JP | 2018-24401 A | 2/2018 |
| JP | 2018-203061 A | 12/2018 |

*Primary Examiner* — Brian J McGovern
(74) *Attorney, Agent, or Firm* — Posz Law Group, PLC

(57) ABSTRACT

A steering wheel includes a boss, a grip having a substantially rod shape and arranged away from the boss, and a spoke portion connecting the boss and the grip. The grip includes a core for the grip, a coating layer which covers an outer peripheral side of the core, and the decorative body exposed on the upper surface side of the grip. The decorative body has a decorative main body exposed on the upper surface side of the grip and a mounting portion having a long shape, being arranged substantially along the grip, holding the decorative main body and being attached to the coating layer. Mounting fitting portions to be attached to the coating layer is arranged on a lower surface side of the mounting portion and on a side separated from the boss and the spoke portion with respect to the core in a cross section of the grip.

10 Claims, 18 Drawing Sheets

(56) References Cited

U.S. PATENT DOCUMENTS

2019/0275935 A1\* 9/2019 Lisseman .................. B60Q 3/62
2020/0156690 A1\* 5/2020 Nonoyama .............. B62D 1/04
2021/0221285 A1\* 7/2021 Kihara ..................... B60Q 3/62

\* cited by examiner

REAR (IN) ⟷ FRONT (OUT)

REAR (IN) ↔ FRONT (OUT)

STEERING WHEEL

CROSS-REFERENCE TO RELATED APPLICATIONS

The present application claims the benefit of priority of Japanese Patent Application No. 2020-146801, filed on Sep. 1, 2020, and Japanese Patent Application No. 2021-058995, filed on Mar. 31, 2021, the disclosures of which are incorporated herein by reference.

TECHNICAL FIELD

The present invention relates to a steering wheel having a configuration in which a decorative body is arranged so as to be exposed at least on an upper surface side of a grip portion to be gripped during rotary steering.

BACKGROUND ART

In a related art, as a steering wheel having a configuration in which a decorative body is arranged on a grip portion, there is a steering wheel having a configuration where the decorative body is attached by attaching a locking portion formed so as to extend downward from a rear surface (lower surface) side of the decorative body exposed on an outer peripheral surface side of the grip portion to a mounting base portion formed so as to cover an outer peripheral side of a core material for the grip portion (see, for example, JP-A-2016-68758).

SUMMARY OF INVENTION

In the steering wheel of the related art, in a region on a front side during straight-ahead steering of the grip portion, which is formed in a substantially annular shape around a boss portion connected to a rotation shaft, the decorative body is arranged so as to be exposed from a boss portion side to an upper surface side and the locking portion extending downward from a rear surface side is arranged at a position closer to the boss portion side than the core material for the grip portion. That is, in the steering wheel of the related art, in the region on the front side during straight-ahead steering away from the boss portion, the core material for the grip portion is arranged on a side separated from the boss portion than a center of a cross section of the grip portion. In other words, a distance from a core material for the boss portion arranged on the boss portion side to a part of the core material for the grip portion provided with the decorative body becomes long. As a result, in some cases, a bending moment becomes large, and thus strength of the core material for the grip portion is lowered.

The present embodiment solves the problems described above and an object thereof is to provide a steering wheel capable of suppressing a decrease in strength of a core material for a grip portion disposed at a part of a grip portion where a decorative body is arranged.

A steering wheel according to the present embodiment which has a configuration where a decorative body is arranged so as to be exposed at least on an upper surface side of a grip portion to be gripped during rotary steering and which has a configuration having a boss portion connected to a rotation shaft, the grip portion having a substantially rod shape and arranged away from the boss portion, and a spoke portion connecting the boss portion and the grip portion and including a core material disposed so as to connect the boss portion, the spoke portion, and the grip portion, wherein the grip portion is configured to include a core material for the grip portion, a coating layer which covers an outer peripheral side of the core material for the grip portion, and the decorative body, the decorative body has a configuration having a decorative main body portion exposed on the upper surface side of the grip portion and a mounting portion which has a long shape which is arranged substantially along the grip portion and which holds the decorative main body portion and is attached to the coating layer, the mounting portion is configured to include a plurality of mounting fitting portions to be attached on the coating layer on a lower surface side, and the mounting fitting portion arranged on a side separated from the boss portion and the spoke portion is formed on a side separated from the boss portion with respect to the core material for the grip portion in a cross section of the grip portion.

In the steering wheel of the present embodiment, in the region separated from the boss portion and spoke portion, the mounting fitting portion for attaching the mounting portion of the decorative body to the coating layer is formed on a side of the cross section of the grip portion separated from the boss portion with respect to the core material for the grip portion. Therefore, in the region where the mounting fitting portion is disposed, the core material of the grip portion can be arranged on a side relatively close to the boss portion in the cross section of the grip portion. That is, in the region separated from the boss portion and the spoke portion in the grip portion, a separation distance between the core material for the grip portion and the core material for the boss portion arranged on the boss portion side can be made relatively short. In other words, in the core material for the grip portion, the region separated from the boss portion and the spoke portion can be brought closer to the boss portion side. Therefore, a value of a maximum bending moment which affects the strength and rigidity of the steering wheel can be reduced. As a result, the strength and rigidity of the core material can be improved.

Therefore, in the steering wheel of the present embodiment, it is possible to suppress a decrease in the strength of the core material for the grip portion disposed at the part of the grip portion where the decorative body is arranged.

In the steering wheel of the present embodiment, the mounting portion of the decorative body can be attached to the coating layer from both the inside and outside of the core material for the grip portion by a plurality of mounting fitting portions arranged on both the inside and outside of the core material for the grip portion so as to straddle the core material for the grip portion. As a result, it is preferable that the decorative body can be stably attached to the coating layer by the mounting portion. Further, in the steering wheel having the configuration described above, the core material for the grip portion is disposed on a side away from the boss portion on a side close to the spoke portion. However, since the core material for the grip portion is close to the spoke portion, there is no effect on the value of the maximum bending moment, and thus it is difficult to reduce the strength and rigidity of the core material.

Specifically, the light bar unit, which can emit light when operated, can be shown as an example of a decorative body installed in the grip portion. The light bar unit is configured to have a cover portion exposed on an outer surface side of the grip portion as the decorative main body portion, a visible light source which is disposed inside and can be turned on during operation, and a light guide body which radiates a visible light emitted from the visible light source toward the cover portion side. In the steering wheel of the present embodiment, the grip portion is composed of a ring portion having an annular shape, the light bar unit is configured as a substantially long shape which is curved and arranged along the ring portion, in the mounting fitting portion, a plurality of separation side mounting fitting portions arranged on a side separated from the boss portion and the spoke portion are arranged along a longitudinal direction of the light bar unit, and the light guide body is formed as a long substantially plate-like body curved so as to substantially follow the light bar unit and is arranged in a disposition region of the separation side mounting fitting portion.

When the steering wheel has such a configuration, an outer edge side of the light bar formed by being curved in a substantially arc shape is attached to the coating layer by the separation side mounting fitting portion. Therefore, compared to the case where only an inner edge side of the light bar is attached to the coating layer, it is possible to suppress the floating of the whole including the outer edge side and to attach the outer edge side to the coating layer in a stable manner. Further, in the steering wheel having such a configuration, the light guide body is a long substantially plate-like body curved so as to substantially follow the light bar unit. However, the light guide body is located in a vicinity of the core material for the grip portion, which is arranged on a side relatively close to the boss portion. Therefore, even when an impact force which presses a part of the ring portion acts on the steering wheel, it is possible to prevent the light bar unit from floating and it is also possible to prevent the light guide body from cracking.

The light bar unit is attached to the coating layer not only by the mounting fitting portion extending from the mounting portion but also by the cover portion side mounting fitting portion protruding downward from the cover portion as the decorative main body portion. Therefore, the mounting strength to the coating layer is improved. Thus, even when an impact force acts on the light bar unit, the light bar unit is prevented from coming off from the coating layer.

DESCRIPTION OF EMBODIMENTS

Figure 1:
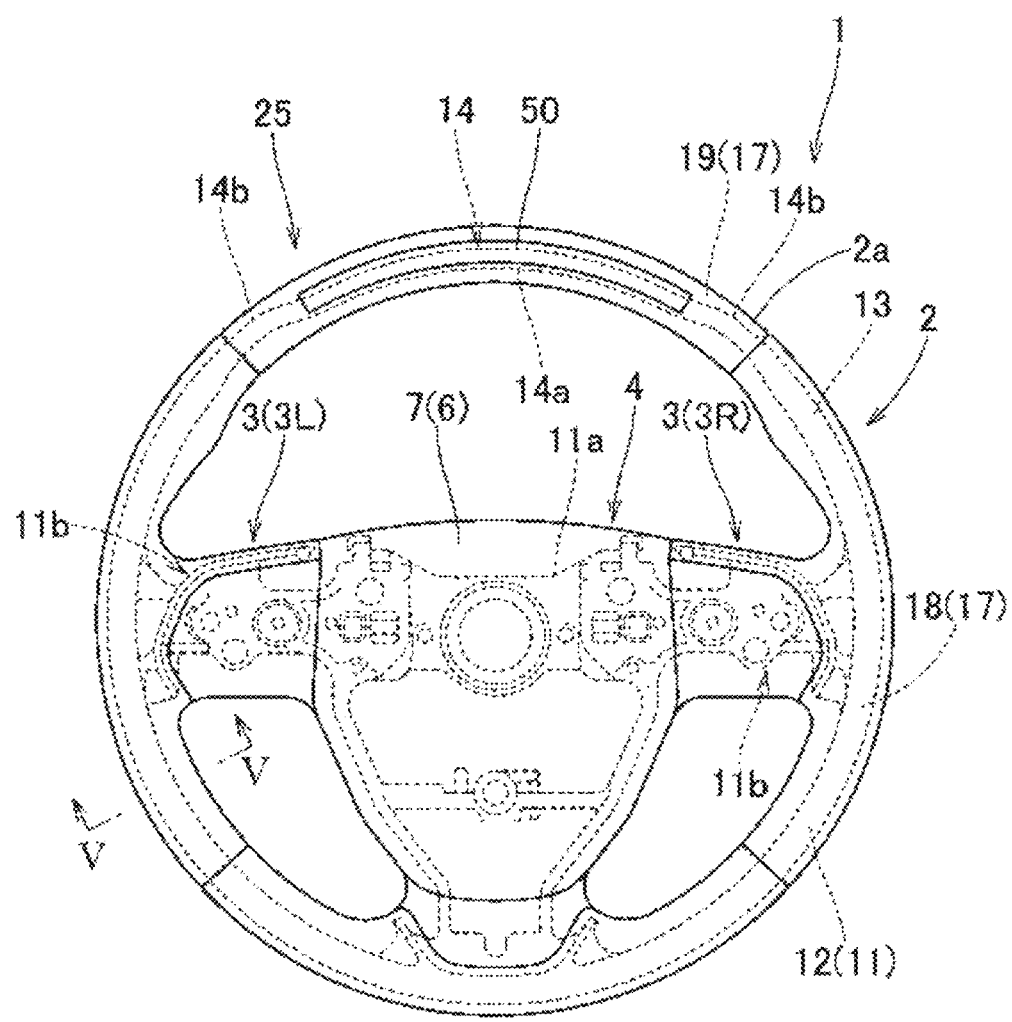
FIG. 1 is a plan view of a steering wheel according to an embodiment of the present invention.

Hereinafter, an embodiment of the present invention will be described with reference to the drawings. In the embodiment, a steering wheel 1 provided with an annular ring portion 2 as a steering wheel will be described as an example. As illustrated in FIG. 1, the steering wheel 1 is configured to include the annular ring portion 2 made of a rod-shaped body as a grip portion to be gripped during rotary steering, a boss portion 4 disposed substantially in a center of the ring portion 2 and connected to a rotation shaft (not illustrated), and a spoke portion 3 which connects the ring portion 2 and the boss portion 4. Also, the steering wheel 1 is configured to include, as components, an airbag device 6 above the boss portion 4, a light bar unit 25 as a decorative body arranged in the ring portion 2, and a steering wheel body 10 other than those described above.

In the specification, unless otherwise specified, the front-rear, up-down, and left-right directions are based on a straight-ahead steering state of the steering wheel 1 mounted on a vehicle, where a direction along a rotation center axis (not illustrated) of the ring portion 2 is set as an up-down direction and a direction perpendicular to the rotation center axis of the ring portion and substantially along a front-rear direction of the vehicle is set as a front-rear direction, and further a direction perpendicular to the rotation center axis of the ring portion 2 and substantially along a left-right direction of the vehicle is set as a left-right direction.

The airbag device 6 disposed above the boss portion 4 includes an airbag (not illustrated) which can be folded and accommodated, an inflator (not illustrated) which supplies expansion gas to the airbag, and a pad 7 which covers an upper surface side of the folded airbag. As illustrated in FIG. 1, the pad 7 is disposed so as to cover the upper surface side of the boss portion 4 over the entire surface.

As illustrated in FIGS. 1 to 7, the steering wheel body 10 includes a core metal 11 as a core material disposed so as to connect the ring portion 2, the boss portion 4, and the spoke portion 3 to each other, a coating layer 17 which covers peripheries of the ring portion 2 and the spoke portion 3 of the core metal 11, an outer skin layer 22 which covers an outer peripheral surface side of the coating layer 17, and a lower cover (not illustrated) which covers a lower surface side of the boss portion 4.

The core metal 11 as a core material is made of a metal made of an aluminum alloy or the like. The core metal 11 includes a boss portion core metal (core material for the boss portion) 11a disposed at a part of the boss portion 4, a spoke portion core metal 11b disposed at a part of the spoke portion 3, and a ring portion core metal (core material for the grip portion) 12 disposed at a part of the ring portion 2.

The ring portion core metal 12 as the core material for the grip portion is composed of a light bar arrangement portion 14 arranged in a disposition region of the light bar unit 25 as a decorative body, that is, in a front side part 2a between the spoke portions 3L and 3R in the ring portion 2, and a general portion 13 other than those described above. The general portion 13 is a region of the ring portion 2 excluding the front side part 2a in which the light bar unit 25 as the decorative body is disposed. In the case of the embodiment, the general portion 13 is arranged in a region extending slightly forward of the left and right spoke portions 3L and 3R. The general portion 13 is configured to be curved in an inverted U shape in cross section and is arranged so that a center of the general portion 13 substantially coincides with a center of the ring portion 2 in a cross section of the ring portion 2 (see FIG. 5). The light bar arrangement portion 14 arranged in a disposition region of the light bar unit 25 is configured to have a substantially rectangular cross-sectional shape in which the up-down and left-right width dimensions are set to be smaller than those of the general portion 13 and the up-down directional side is wide. Specifically, the light bar arrangement portion 14 is arranged in a region of about a lower half of the ring portion 2 so as to suppress interference with the light bar unit 25 disposed on an upper side in the ring portion 2 (see FIGS. 6 and 7). That is, in the ring portion core metal 12 of the embodiment, in a state where the ring portion 2 (steering wheel 1) is viewed from the left and right sides, the light bar arrangement portion 14 is provided with a step so as to be located on a lower side with respect to the general portion 13 (see FIG. 4). Further, in the light bar arrangement portion 14, a central part 14a excluding an end side part 14b on the general portion 13 side is configured so that a center (center on the lateral directional side) in the front-rear direction is located further on an inner side (rear side) than a center of a cross section in the ring portion 2 (see FIG. 6). In the light bar arrangement portion 14, the end side part 14b connected to the general portion 13 is configured so that a center (center on the lateral directional side) in the front-rear direction is located further on an outer side (front side) than the center of the cross section in the ring portion 2 (see FIG. 7). In other words, when seen from the up-down directional side, the light bar arrangement portion 14 is configured so as to be gently bent at a displacement portion 14c (a boundary part between the central part 14a and the end side part 14b) arranged between the central part 14a and the end side part 14b so that the central part 14a is located on the inside (boss portion 4 side), and the end side part 14b is located on the outside (side away from the boss portion 4) (see FIGS. 1 to 3).

Figure 5:
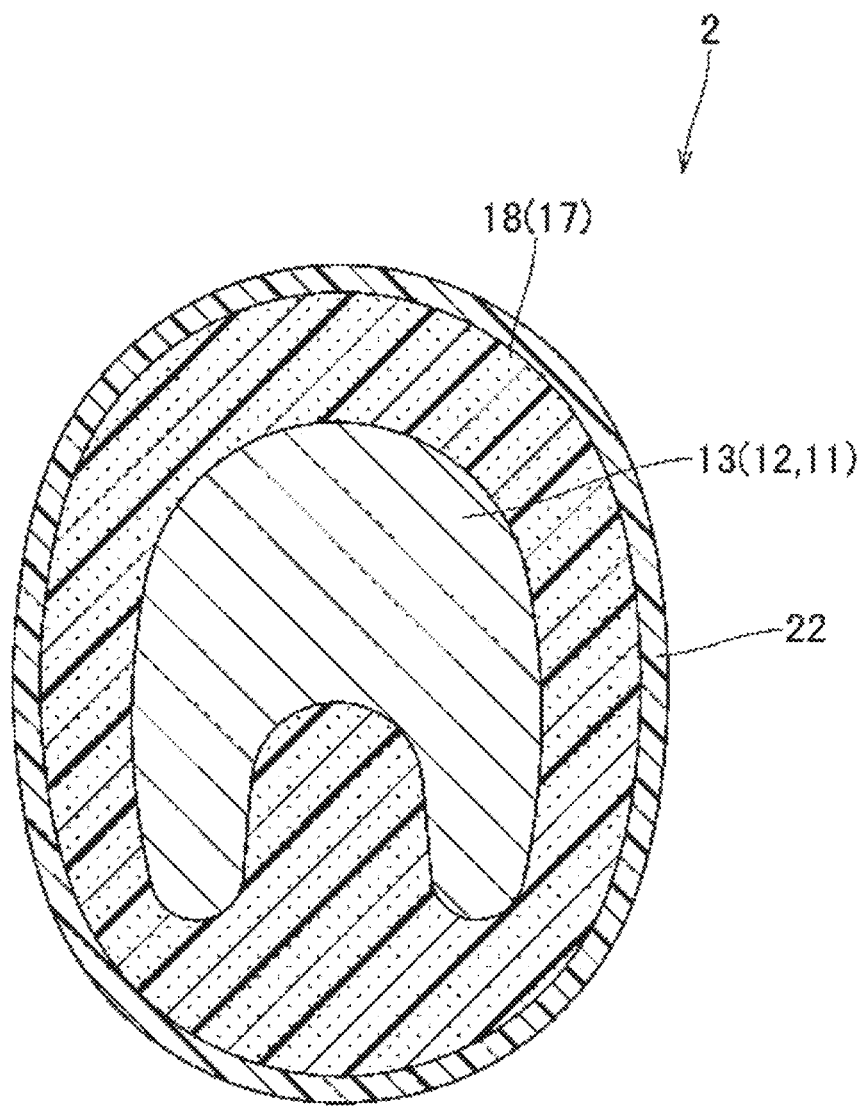
FIG. 5 is a cross-sectional view of the steering wheel of the embodiment, which corresponds to the V-V part of FIG. 1.
Figure 6:
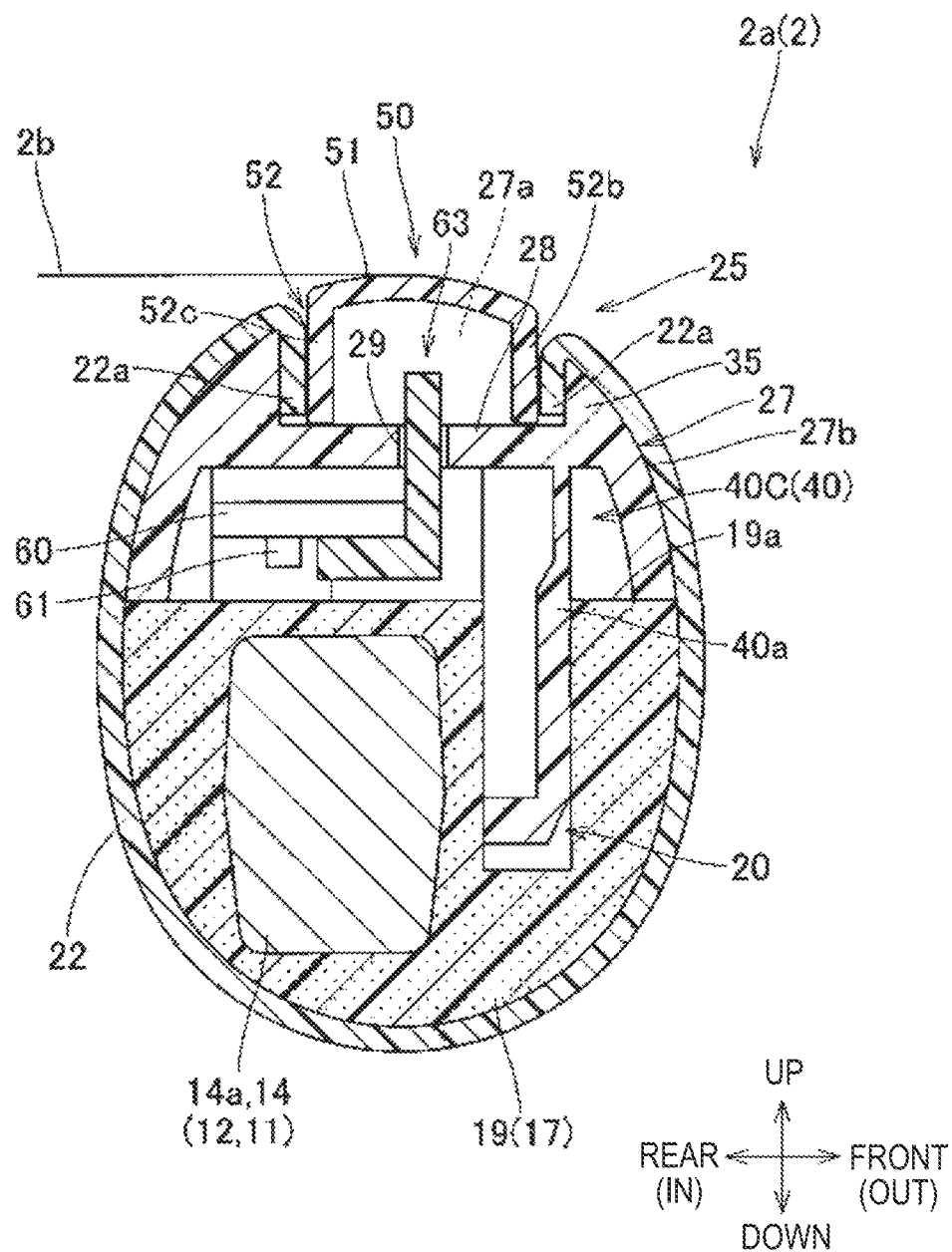
FIG. 6 is a cross-sectional view of the steering wheel of the embodiment, which corresponds to the VI-VI part of FIG. 2.
Figure 7:
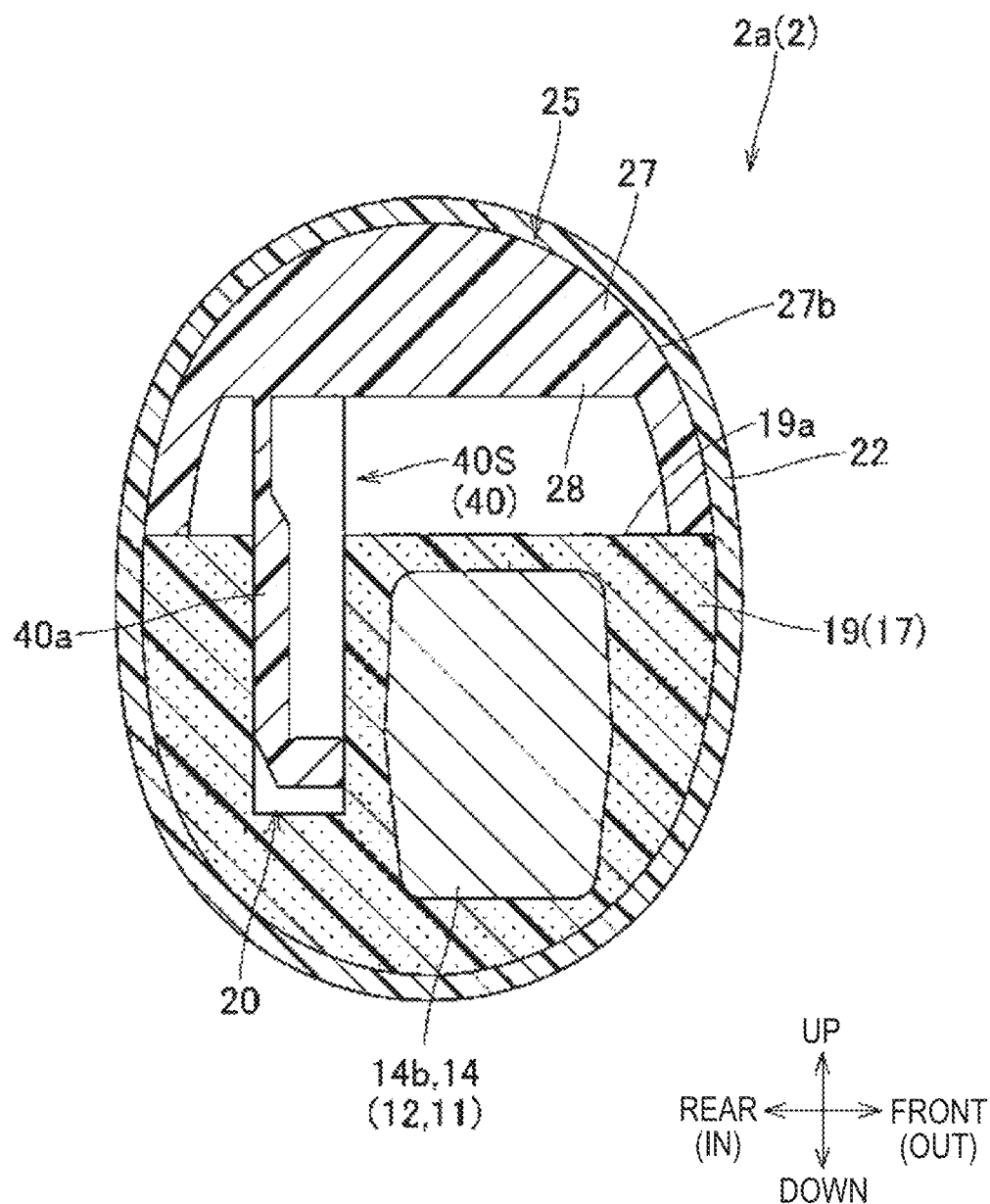
FIG. 7 is a cross-sectional view of the steering wheel of the embodiment, which corresponds to the VII-VII part of FIG. 2.
Figure 8:
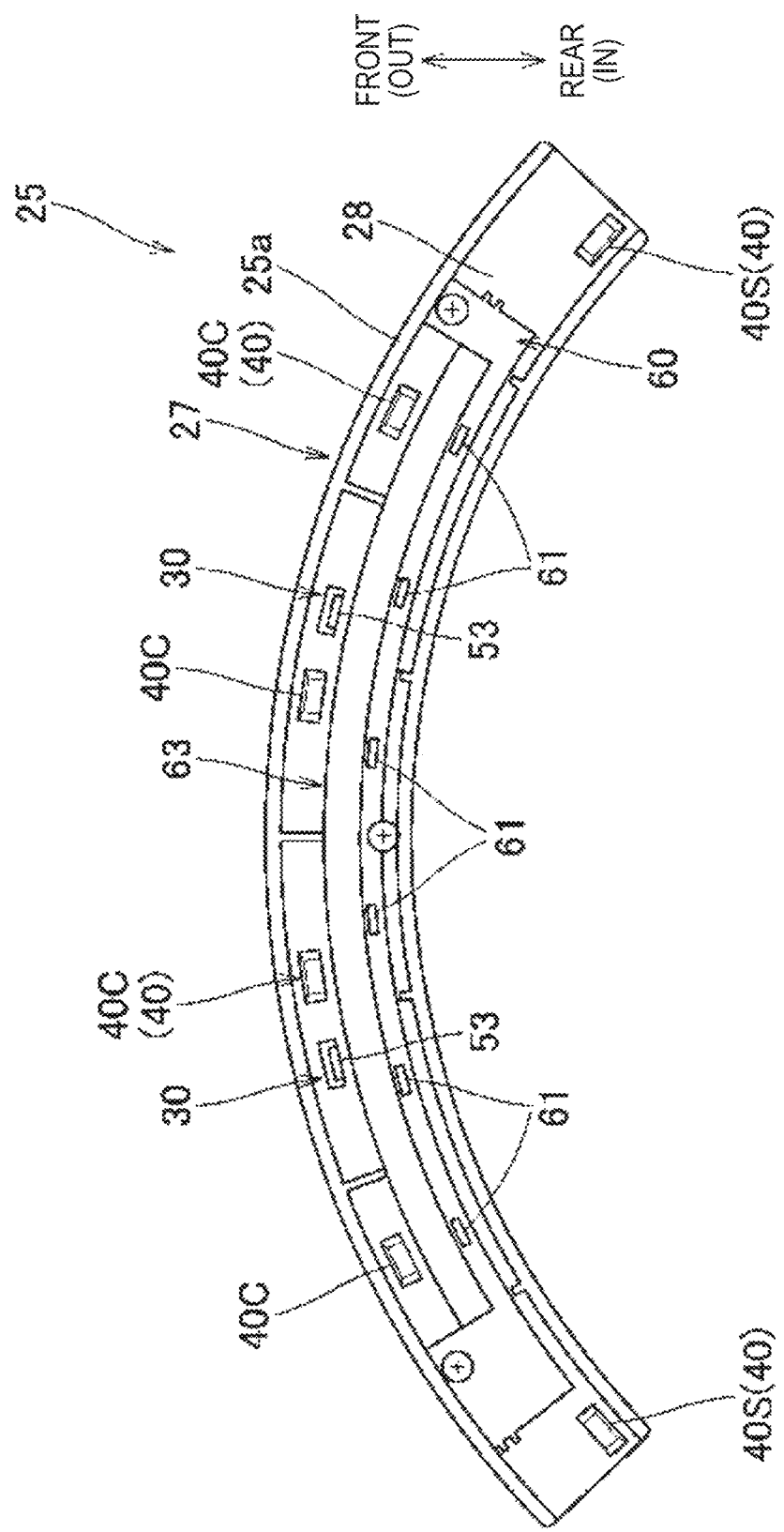
FIG. 8 is a bottom view of the light bar unit used in the steering wheel of the embodiment.
Figure 9:
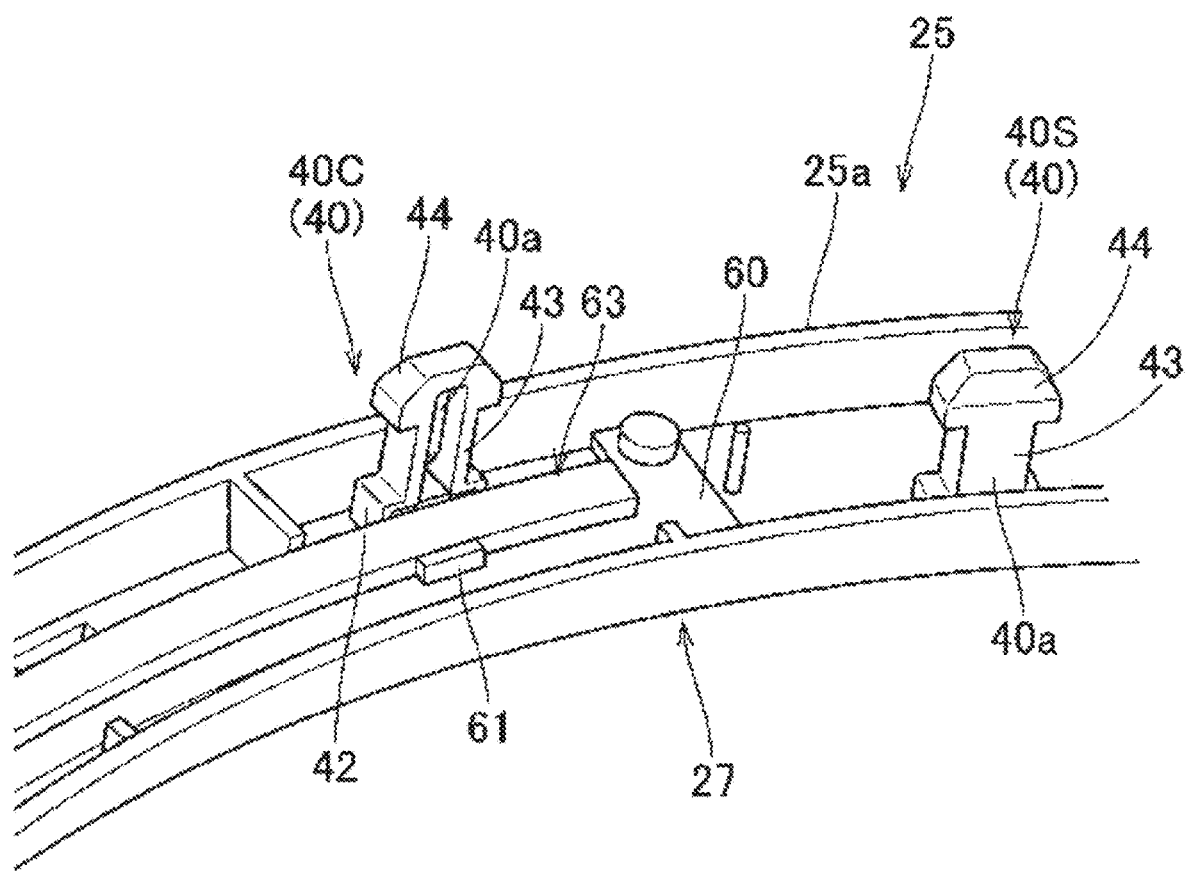
FIG. 9 is a partially enlarged schematic perspective view of the light bar unit of FIG. 8 as viewed from a bottom surface side.

The coating layer 17 is formed of a soft synthetic resin having a cushioning property, and in the case of the embodiment, the coating layer 17 is formed of a soft foaming material such as polyurethane foam. As illustrated in FIGS. 5 to 7, the coating layer 17 is configured to cover an outer peripheral side of the ring portion core metal 12 (general portion 13, light bar arrangement portion 14) at a part of the ring portion 2. Specifically, in the coating layer 17, a general portion side part 18 covering an outer peripheral side of the general portion 13 has a substantially elliptical cross-sectional shape with a wide up-down directional side as illustrated in FIG. 5. In the coating layer 17, a light bar side part 19 which covers an outer peripheral side of the light bar arrangement portion 14 has a substantially semi-elliptical cross-sectional shape so that an upper region on which the light bar unit 25 is arranged is cut out (see FIGS. 6 and 7). The light bar side part 19 is configured such that an upper surface 19a is substantially parallel to a ring surface 2b (see FIG. 6) in the ring portion 2.

Figure 10A:
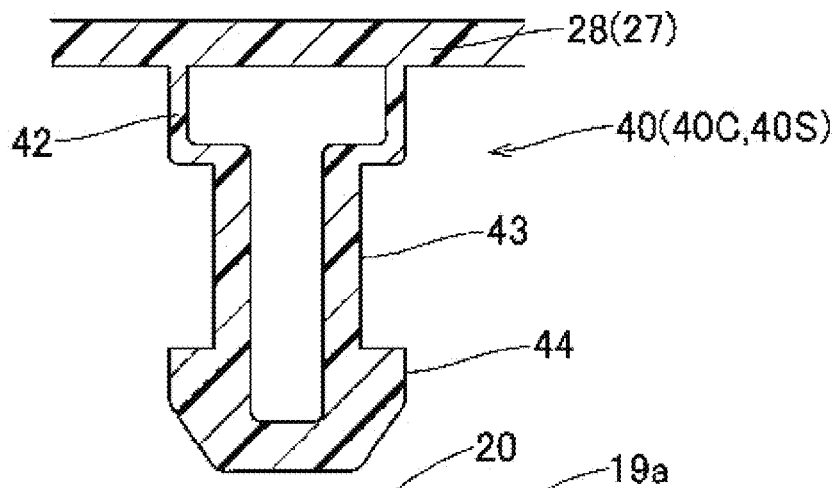
FIGS. 10A and 10B are schematic cross-sectional views illustrating a state in which a fitting protrusion portion formed on a holding member is fitted into a fitting recess portion formed on a coating layer in the steering wheel of the embodiment.

Also, in the light bar side part 19, a fitting recess portion 20 for fitting a fitting protrusion portion 40 as a mounting fitting portion formed on a holding member 27 (mounting portion) in the light bar unit 25 is formed so that an upper surface 19a is recessed downward. The fitting recess portions 20 are formed corresponding to the fitting protrusion portions 40, and in the case of the embodiment, the fitting recess portions 20 are scattered at six locations along a longitudinal direction of the light bar side part 19 (see FIG. 2). The fitting recess portions 20 disposed on both end sides on the spoke portions 3L and 3R sides are formed at positions which are inside (rear side) of the light bar arrangement portion 14 (for details, the end side part 14b in the light bar arrangement portion 14) and the remaining four fitting recess portions 20 on the central side are formed at positions which are outside (front side) of the light bar arrangement portion 14 (central part 14a). Each fitting recess portion 20 is configured by opening an upper end side so that the fitting protrusion portion 40 can be inserted from above. As illustrated in FIGS. 6 and 7, in the fitting recess portion 20, a cross-sectional shape on a directional side along a ring portion cross-section is a groove shape in which an opening width dimension is substantially constant over the entire vertical region and a cross-sectional shape on a directional side (the directional side along the longitudinal direction of the light bar unit 25) perpendicular to the ring portion cross section is configured such that the upper end side is narrow and the lower end side is wide (see FIGS. 10A and 10B). The opening width dimension of a narrow width portion 20a on an upper end side of the fitting recess portion 20 is set to a dimension which allows a neck portion 43 described below in the fitting protrusion portion 40 to be inserted and a width dimension of a wide width portion 20b on the lower end side is set so that a head portion 44 described below in the fitting protrusion portion 40 can be inserted. A boundary part between the narrow width portion 20a and the wide width portion 20b is configured to be widened in a tapered shape toward the wide portion 20b.

The outer skin layer 22 arranged to cover an outer peripheral side of the coating layer 17 is configured to cover the outer peripheral side of the general portion side part 18 over the entire surface. In the light bar side part 19, the outer skin layer 22 is configured to cover the outer peripheral side including an outer peripheral side of the holding member 27, which will be described below, so as to cover the entire surface of the light bar unit 25 excluding a disposition region of a cover portion 50, which will be described below (see FIGS. 5 to 7). In the case of the embodiment, the outer skin layer 22 is formed of a sheet body made of synthetic resin or leather such as natural leather, synthetic leather, or artificial leather.

The light bar unit 25 as the decorative body is configured as a substantially long shape which is curved and arranged substantially along the ring portion 2. In the case of the embodiment, the light bar unit 25 is arranged so as to be exposed on an upper surface side of the front side part 2a between the left and right spoke portions 3L and 3R in the ring portion 2. In the case of the embodiment, the light bar unit 25 is configured so that the outer peripheral side of the holding member 27 is covered with the outer skin layer 22 and only the cover portion 50 is exposed, as described above (see FIGS. 1, 2, 6, and 7). Specifically, the light bar unit 25 is formed in a region of about ¼ of the ring portion 2 so that the center in the longitudinal direction substantially coincides with a front end in the ring portion 2. Further, the cover portion 50 in the light bar unit 25 is formed in a region of about ⅙ of the ring portion 2 so that the center in the longitudinal direction substantially coincides with the center in the longitudinal direction of the light bar unit 25 (see FIGS. 1 and 2).

As illustrated in FIGS. 6 to 9, the light bar unit 25 is configured to includes the holding member 27 as a mounting portion, a substrate 60 held by the holding member 27, a visible light source (visible light LED 61) which is attached to the substrate 60 and emits a visible light when lit, a light guide body 63, and the cover portion 50 arranged so as to cover a radiation opening 27a described below in the holding member 27. In the light bar unit 25, a decorative main body portion is configured to include the cover portion 50 exposed on an outer surface side of the ring portion 2, the visible light LED 61 which is disposed inside and can be turned on during operation, and the light guide body 63 which radiates a visible light emitted from the visible light LED 61 toward the cover portion 50 side.

The holding member 27 as a mounting portion is made of synthetic resin (in the case of the embodiment, made of polycarbonate resin). The holding member 27 is configured to be disposed above the light bar side part 19 in the coating layer 17 in the front side part 2a of the ring portion 2. Also, the holding member 27 is formed as a long shape substantially along the ring portion 2 and is curved when viewed from the up-down directional side (see FIG. 11). The holding member 27 is configured to be attached to the coating layer 17 (light bar side part 19) while holding the substrate 60 and the cover portion 50 as the decorative main body portion. The holding member 27 is configured by bending an outer surface 27b so as to be connected to the outer surface of the light bar side part 19 in the coating layer 17. Also, the holding member 27 is configured by recessing a central region for attaching the cover portion 50 and the substrate 60 to attach the cover portion 50 (see FIGS. 6 and 7). That is, the holding member 27 includes a mounting wall portion 28 for attaching and holding the substrate 60 in a central region and a peripheral wall portion 35 extending upward from the mounting wall portion 28. Further, the holding member 27 is configured to open an upper end side of a region surrounded by the mounting wall portion 28 and the peripheral wall portion 35. An opening on an upper end side of the peripheral wall portion 35 forms the radiation opening 27a capable of radiating a visible light during operation. As illustrated in FIG. 6, the mounting wall portion 28 is formed so as to substantially follow the front-rear direction (the ring surface 2b in the ring portion 2, that is, the upper surface 19a in the light bar side part 19). In the case of the embodiment, the substrate 60 is configured to be attached to a rear surface (lower surface) side of the mounting wall portion 28. An insertion hole 29 through which the light guide body 63 can be inserted is formed in a vicinity of a center in the width direction of the mounting wall portion 28 in a continuous groove shape (see FIGS. 6 and 11).

Figure 11:
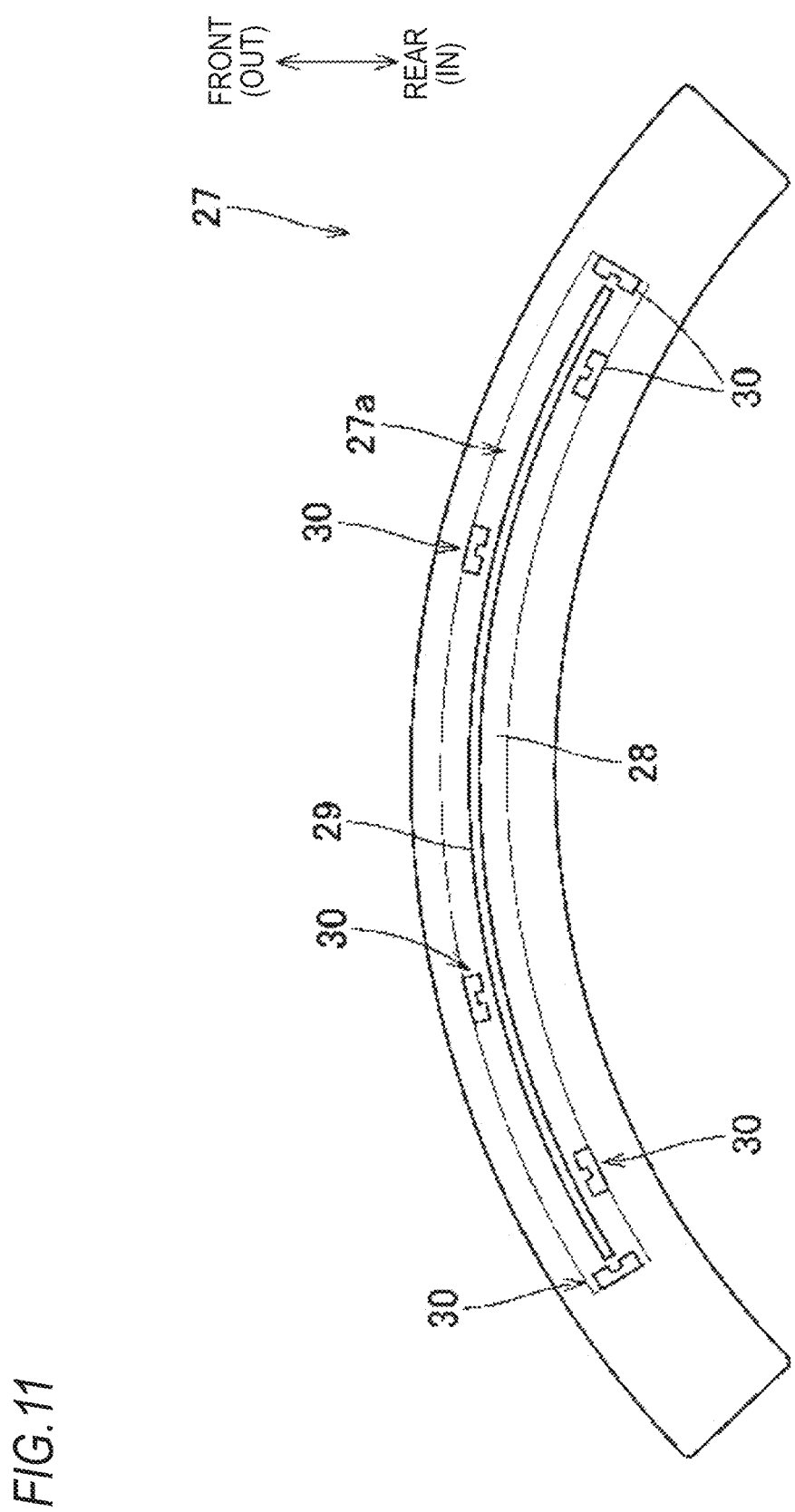
FIG. 11 is a plan view of the holding member in the light bar unit.
Figure 12:
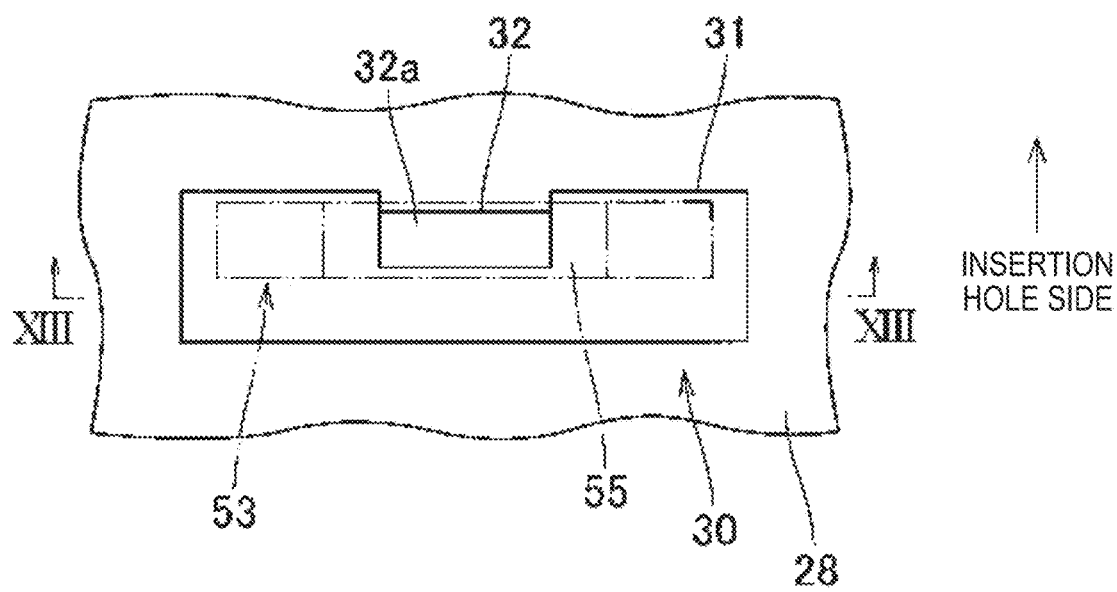
FIG. 12 is a partially enlarged plan view illustrating a part of a locking recess portion in the holding member.
Figure 13:
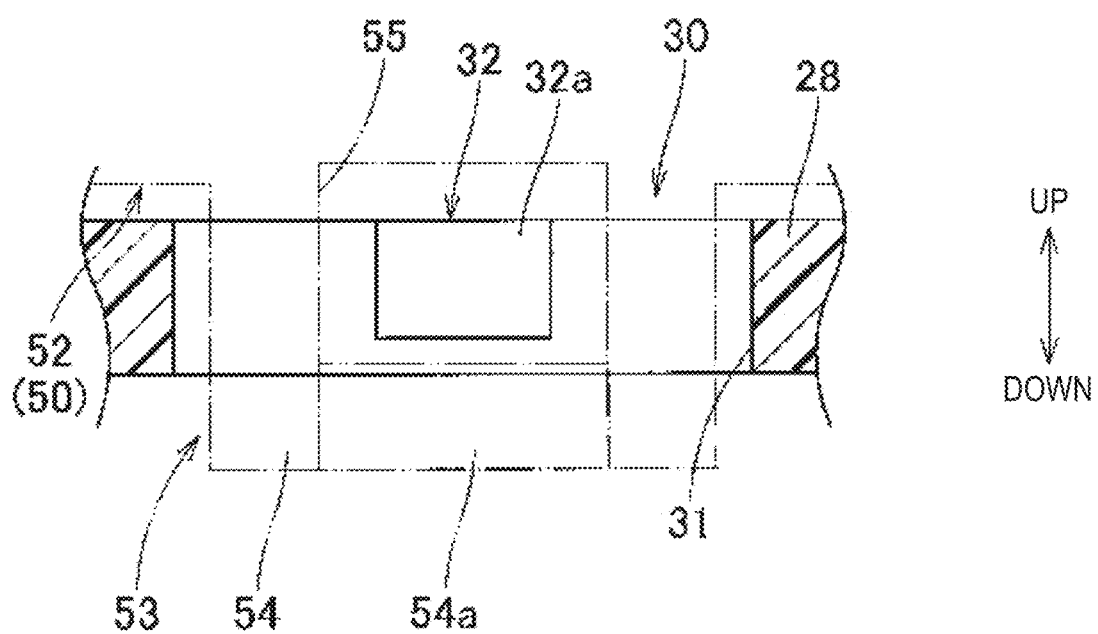
FIG. 13 is a cross-sectional view of the part of the locking recess portion, which corresponds to the XIII-XIII part of FIG. 12.
Figure 15:
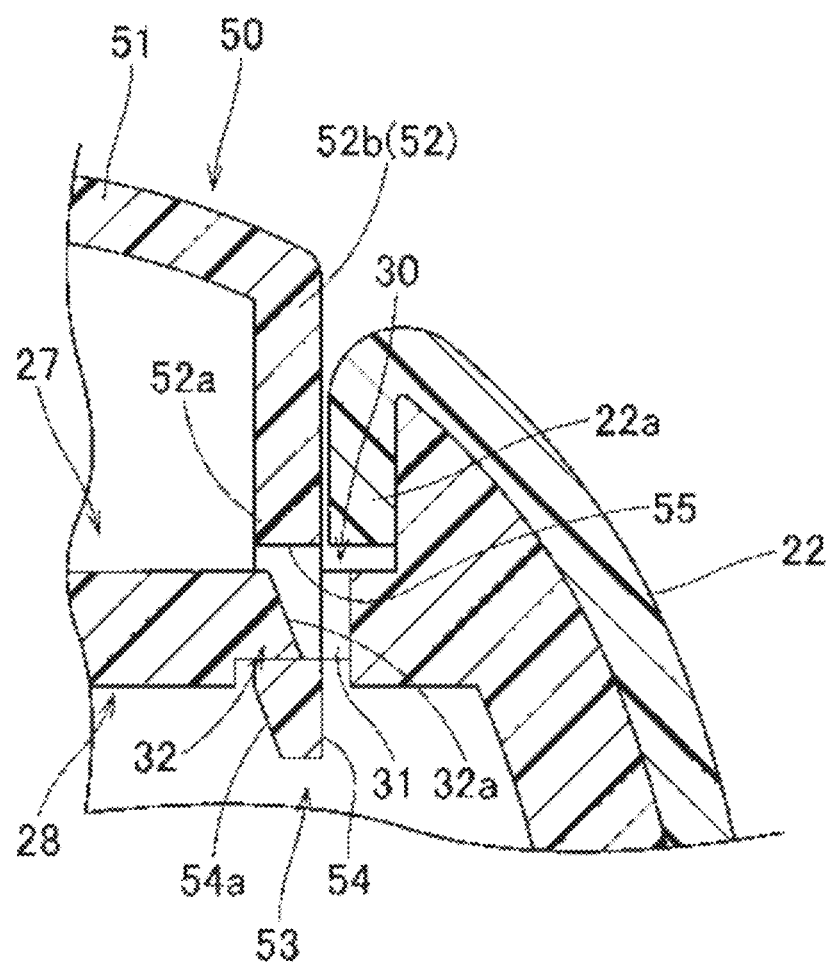
FIG. 15 is a schematic cross-sectional view illustrating a state in which a locking protrusion piece of a cover portion is locked to the locking recess portion of the holding member in the steering wheel of the embodiment.
Figure 16:
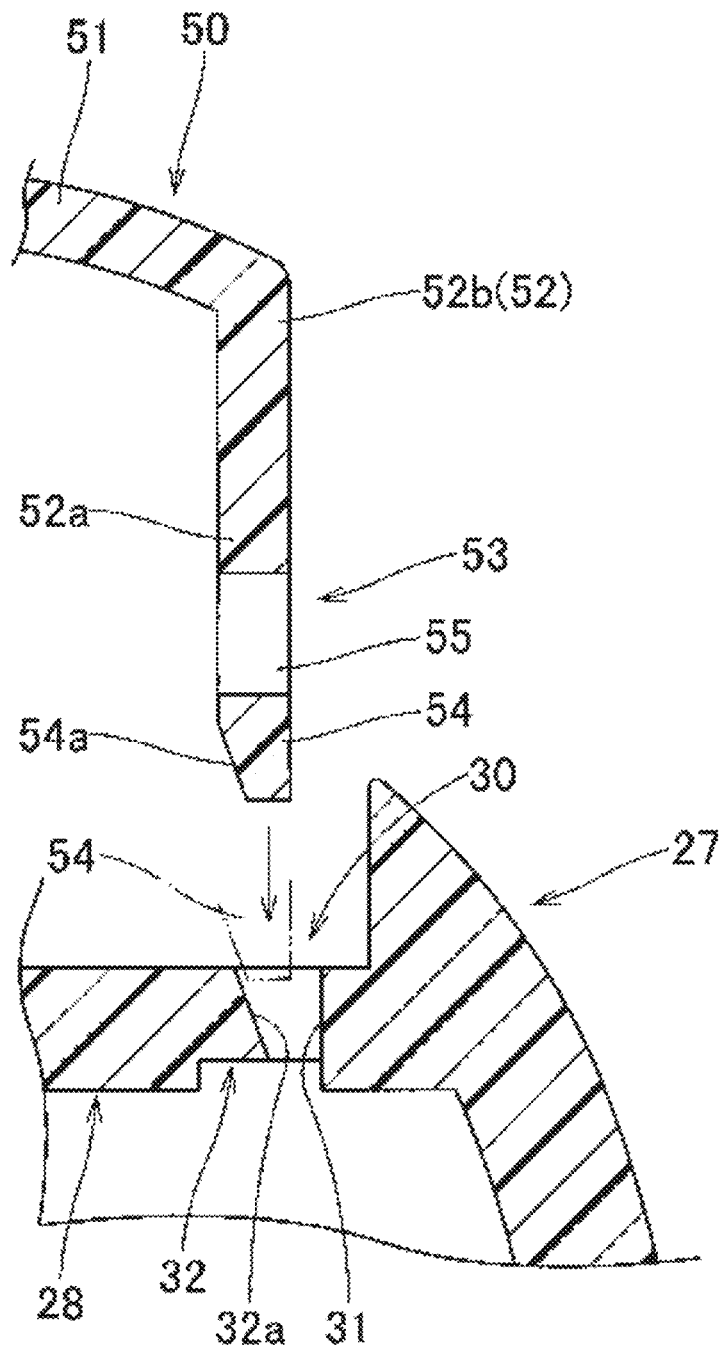
FIG. 16 is a schematic cross-sectional view illustrating a state in which the locking protrusion piece of the cover portion is locked to the locking recess portion of the holding member in the steering wheel of the embodiment.

Further, on an outer peripheral edge side of the mounting wall portion 28, a locking recess portion 30 is formed in which a locking protrusion piece 53, which will be described below and formed in the cover portion 50, is inserted and locked. Corresponding to the locking protrusion pieces 53 of the cover portion 50, as illustrated in FIG. 11, the locking recess portions 30 are formed at six locations: two locations on both edge sides in the longitudinal direction, two locations separated on the longitudinal directional side on a front edge side, and two locations near both edges in the longitudinal direction on the rear edge side. As illustrated in FIGS. 12, 13, 15, and 16, each locking recess portion 30 includes an insertion hole 31 formed by penetrating the mounting wall portion 28 in a flat, substantially rectangular shape so that the locking protrusion piece 53 can be inserted and a protrusion portion 32 formed so as to partially protrude from an inner peripheral surface of the insertion hole 31. The protrusion portion 32 is inserted into a locking hole 55 formed in the locking protrusion piece 53 and locked to a peripheral edge of the locking hole 55. On a long side of the insertion hole 31 and near a center of an inner peripheral surface of the mounting wall portion 28 on a center side (insertion hole 29 side), the protrusion portion 32 is formed so as to protrude outward as a substantially square columnar shape arranged over substantially the entire vertical region except a vicinity of the lower end. In the case of the embodiment, in detail, the protrusion portion 32 has a substantially rectangular outer shape when viewed from an inside-outside (front-rear) directional side (see FIG. 13). Also, the protrusion portion 32 is configured such that a protrusion amount is about half the width dimension of the insertion hole 31 (see FIG. 12). Further, the protrusion portion 32 is configured such that a tip surface 32a is inclined so as to increase the protrusion amount toward the lower side. As illustrated in FIGS. 15 and 16, the tip surface 32a is formed so as to substantially follow a guide surface 54a formed on a tip side part 54 described below of the locking protrusion piece 53. The tip surface 32a is formed to facilitate the work of inserting the locking protrusion piece 53 into the locking recess portion 30.

The holding member 27 is provided with the fitting protrusion portions 40 as a plurality of mounting fitting portions to be attached to the coating layer 17 (light bar side part 19) on the lower surface side. As illustrated in FIGS. 6 and 7, the fitting protrusion portions 40 are formed so as to protrude downward from a lower surface of the mounting wall portion 28 and are scattered at six locations along a longitudinal direction of the holding member 27. Specifically, as illustrated in FIGS. 2, 3, and 6 to 8, in a central region which is a disposition region (the disposition region of the light guide body 63) of the cover portion 50, a plurality (four in the case of the embodiment) of the fitting protrusion portions 40 are arranged along a front edge (substantially along the longitudinal direction of the light bar unit 25) on the front edge (outer edge) side (an outer edge 25a side of the light bar unit 25) of the mounting wall portion 28. Further, on both end sides away from cover portion 50, the fitting protrusion portions 40 are formed at two locations near a rear edge (inner edge) of the mounting wall portion 28. That is, a central fitting protrusion portion (separation side mounting fitting portion) 40C arranged in a disposition region (the side separated from the boss portion 4 and the spoke portions 3L and 3R) of the cover portion 50 is formed on a front side (outside, that is, the side away from the boss portion 4) with respect to the central part 14a of the light bar arrangement portion 14 in a cross section of the ring portion 2 (see FIG. 6). Further, in a cross section of the ring portion 2, spoke side fitting protrusion portions 40S arranged on both end sides (near the spoke portions 3L and 3R) where the cover portion 50 is not disposed are formed on the rear side (inside, that is, the side close to the boss portion 4) with respect to the end side part 14b of the light bar arrangement portion 14 (see FIG. 7).

Figure 10A:
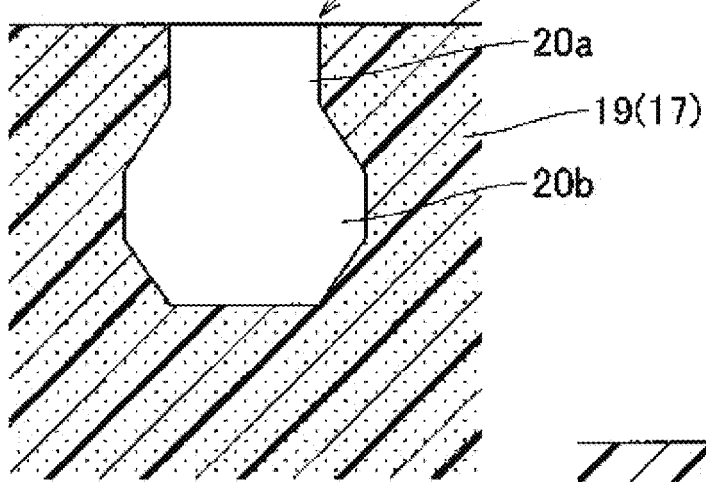
Figure 10B:
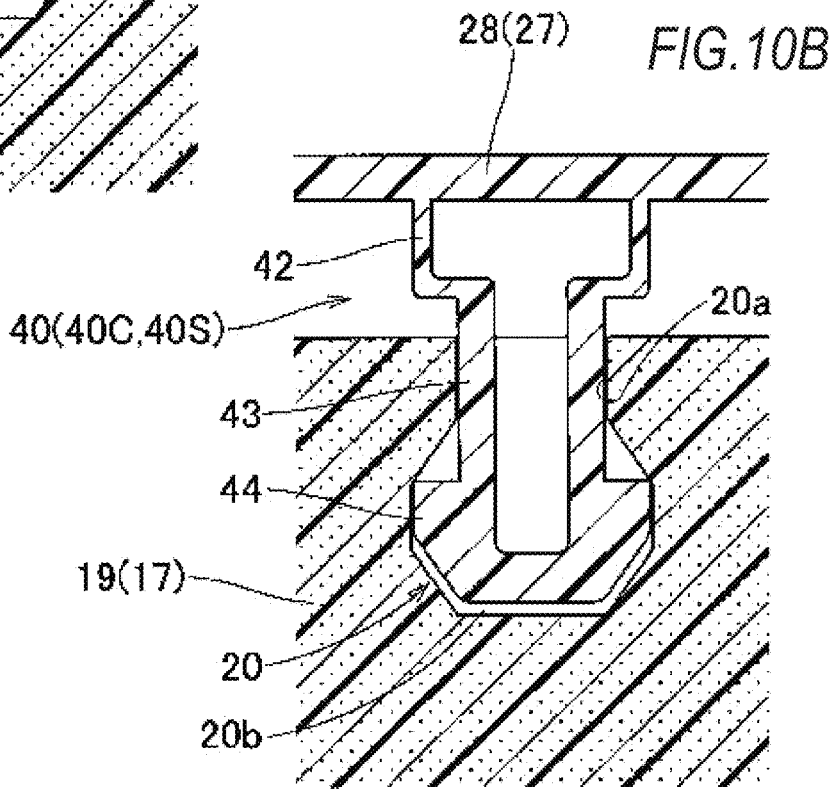

As illustrated in FIGS. 6, 7, and 10, each fitting protrusion portion 40 (central fitting protrusion portion 40C, spoke side fitting protrusion portion 40S) is fitted to the fitting recess portion 20 formed so that the upper surface 19a is recessed downward at the light bar side part 19 in the coating layer 17. The fitting protrusion portion 40 is configured by arranging a pedestal portion 42, the neck portion 43, and the head portion 44 in order from a base portion side (see FIGS. 9 and 10). The fitting protrusion portion 40 is arranged so that the width direction is substantially along the longitudinal directional side of the holding member 27 and is configured so that a thickness dimension is substantially constant (see FIGS. 6 and 7). The neck portion 43 is inserted through the narrow width portion 20a on the upper end side of the fitting recess portion 20 and the width dimension is set to a dimension which allows the neck portion 43 to be inserted into the narrow width portion 20a. The head portion 44 is set to have a width dimension larger than the neck portion 43, that is, a dimension larger than the narrow width portion 20a. Also, the head portion 44 is set to a dimension which can be accommodated in the wide width portion 20b in the fitting recess portion 20. The pedestal portion 42 is configured so that the width dimension is larger than the neck portion 43 and, in the case of the embodiment, is substantially the same as the width dimension of the head portion 44. When the fitting protrusion portion 40 is inserted into the fitting recess portion 20 (when the light bar unit 25 is attached to the light bar side part 19), the pedestal portion 42 abuts on an opening peripheral edge on the upper end side of the fitting recess portion 20 and functions as a stopper capable of suppressing further downward movement of the fitting protrusion portion 40. Further, in the case of the embodiment, the fitting protrusion portion 40 is formed in a hollow shape. Further, on a side surface on a thickness directional side (front-rear directional side, inside-outside directional side), the fitting protrusion portion 40 is configured to include a side wall portion 40a which closes the entire surface on an end surface side (the front surface side in the central fitting protrusion portion 40C, the rear surface side in the spoke side fitting protrusion portion 40S) on a side away from the cover portion 50 (see FIGS. 6, 7, 9, and 10).

As described above, the fitting recess portion 20 into which each fitting protrusion portion 40 is inserted is formed so as to dent the upper surface 19a side of the light bar side part 19 in the coating layer 17 made of a soft foaming material. Therefore, in a case of inserting the fitting protrusion portion 40, even when the head portion 44 is set to have a width dimension larger than that of the narrow width portion 20a, the head portion 44 can be inserted through the narrow width portion 20a by compressing an opening peripheral edge of the fitting recess portion 20. Then, when the head portion 44 reaches the wide width portion 20b, the compressed region of the opening peripheral edge of the fitting recess portion 20 is restored so as to cover an upper part of the head portion 44 (see FIG. 10B).

Figure 14:
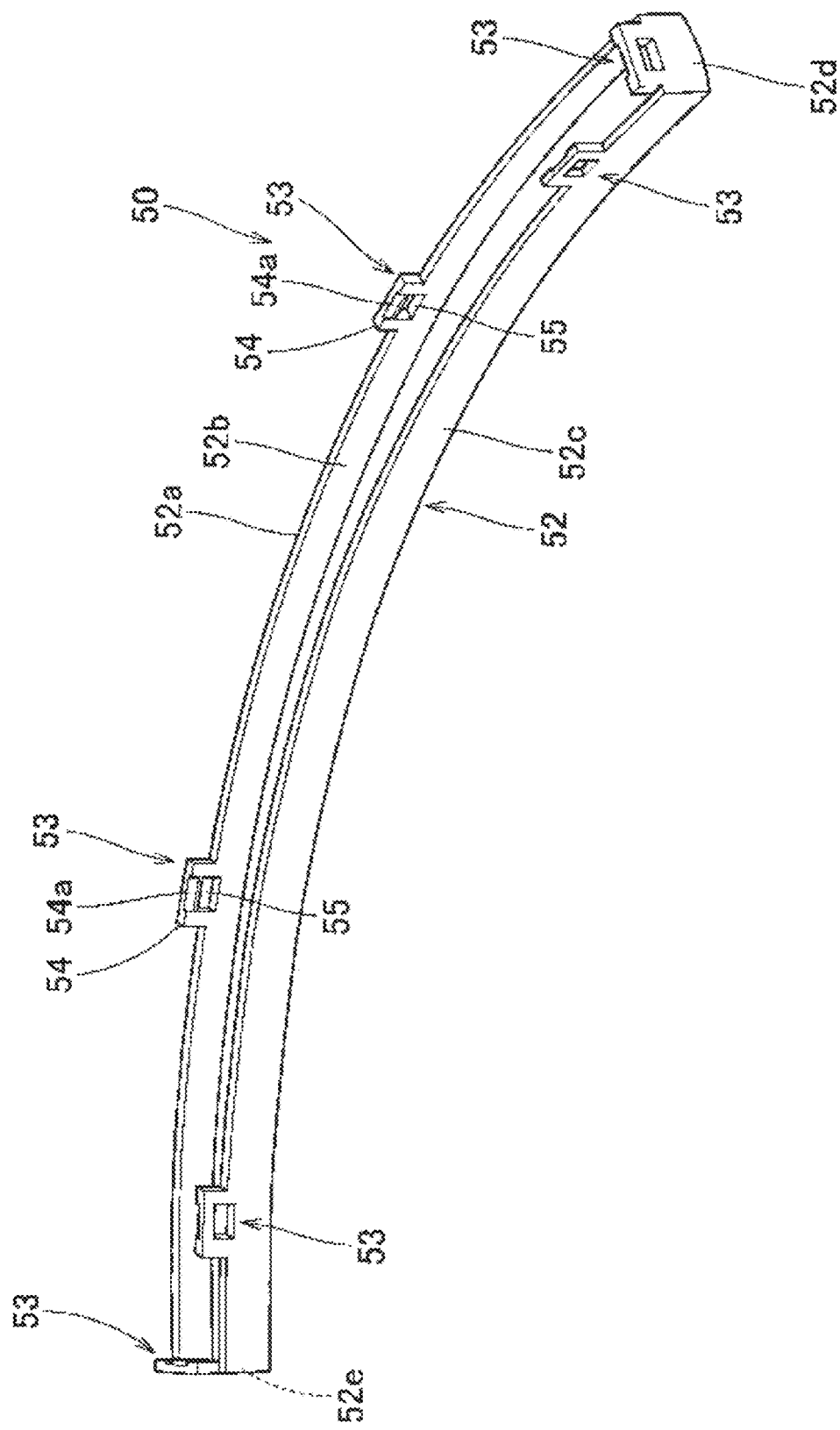
FIG. 14 is a schematic perspective view of a cover portion of the light bar unit as viewed from below.

The cover portion 50 forming the decorative main body portion is configured to cover the radiation opening 27a formed on the holding member 27 over substantially the entire surface and is attached to the holding member 27. In the case of the embodiment, as illustrated in FIGS. 6 and 14, the cover portion 50 is configured as a substantially box shape having an upper wall portion 51 covering the radiation opening 27a and a substantially tubular peripheral wall portion 52 extending downward from a peripheral edge of the upper wall portion 51. In the embodiment, as described above, in the light bar unit 25, only the upper wall portion 51 in the cover portion 50 is exposed from the outer skin layer 22 and arranged (see FIGS. 1, 2, and 6). In the case of the embodiment, the cover portion 50 is made of a transparent black synthetic resin having translucency in accordance with the black outer skin layer 22. The cover portion 50 is configured to be capable of transmitting a visible light emitted from the visible light LED 61, which will be described below. The upper wall portion 51 is formed so as to be curved so that an upper surface thereof is gently connected to an outer surface of the outer skin layer 22. The cover portion 50 is configured to provide a gap between the peripheral wall portion 52 and the peripheral wall portion 35 of the holding member 27. Also, the cover portion 50 has a configuration in which a terminal 22a of the outer skin layer 22 is disposed in the gap between the peripheral wall portions 52 and 35 (see FIG. 6). On a lower end 52a side of the peripheral wall portion 52 of the cover portion 50, the locking protrusion piece 53 for attaching the cover portion 50 to the mounting wall portion 28 of the holding member 27 is formed. As described above, the locking protrusion piece 53 is inserted into the locking recess portion 30 formed on the outer peripheral edge side of the mounting wall portion 28 and locked. The locking protrusion pieces 53 are scattered on the peripheral wall portion 52. Specifically, as illustrated in FIG. 14, the locking protrusion pieces 53 are formed at a total of six locations: a left wall portion 52d and a right wall portion 52e disposed on both end sides in the longitudinal direction, two locations on a front wall portion 52b disposed on the outside (front side), and two locations near the left wall portion 52d and the right wall portion 52e in a rear wall portion 52c disposed on the inner side (rear side). The locking protrusion piece 53 arranged on the front wall portion 52b is formed at a position further on a left and right center side than the locking protrusion piece 53 arranged on the rear wall portion 52c.

As illustrated in FIGS. 14 to 16, each locking protrusion piece 53 is formed so as to extend directly below the peripheral wall portion 52 along with the peripheral wall portion 52 and having a thickness dimension substantially equal to a plate thickness of the peripheral wall portion 52. Each locking protrusion piece 53 is formed in a substantially square ring shape by penetrating the locking hole 55 opened in a substantially square shape in the center (see the alternate long and short dash line in FIG. 13 and FIG. 14). The locking hole 55 is configured such that the protrusion portion 32 formed in the locking recess portion 30 is inserted so that the protrusion portion 32 can be locked to the peripheral edge. In the locking protrusion piece 53, in the tip side part 54 disposed on a lower side (tip side) of the locking hole 55, on an inner side surface side (the side surface side disposed so as to face the tip surface 32a of the protrusion portion 32) which is an inner circumference side of the cover portion 50, the guide surface 54a, which serves as a guide when inserted into the locking recess portion 30, is formed so as to be inclined with respect to the up-down direction. Specifically, as illustrated in FIGS. 15 and 16, the guide surface 54a is formed by cutting out the inner side surface side so that the tip side part 54 is thinned over the terminal. As described above, this guide surface 54a is formed so as to substantially follow the tip surface 32a of the protrusion portion 32 that partially protrudes from the inner peripheral surface of the insertion hole 31 of the locking recess portion 30. Next, when the locking protrusion piece 53 is inserted into the locking recess portion 30, the locking protrusion piece 53 rides over the protrusion portion 32 by sliding and bending the guide surface 54a formed on the tip side part 54 along the tip surface 32a of the protrusion portion 32 protruding partially from the inner peripheral surface of the insertion hole 31. Then, when the locking hole 55 reaches the position of protrusion portion 32, the locking protrusion piece 53 restores its bent state and the protrusion portion 32 is inserted into the locking hole 55, so that the locking protrusion piece 53 is locked to the locking recess portion 30.

In the steering wheel 1 of the embodiment, the locking protrusion piece 53 which attaches the cover portion 50 to the holding member 27 protrudes directly downward from the peripheral wall portion 52 and is locked to the locking recess portion 30 formed at the mounting wall portion 28 in the holding member 27. Also, the locking protrusion piece 53 is not configured to protrude outward from the peripheral wall portion 52. Therefore, after attaching the cover portion 50 to the holding member 27, the outer skin layer 22 is wrapped around the light bar unit 25 and the coating layer 17 (light bar side part 19), and thus the workability is good when the terminal 22a is pushed between the peripheral wall portions 35 and 52. Further, during such work, damage to a part connecting the cover portion 50 and the holding member 27 can be suppressed.

The substrate 60 is arranged on a lower surface (rear surface) side of the mounting wall portion 28 substantially along the mounting wall portion 28 in the front-rear direction. In the case of the embodiment, as illustrated in FIG. 6, the substrate 60 is arranged in a region (region up to the insertion hole 29) about the rear half (inner half) on a lower surface side of the mounting wall portion 28. On the longitudinal directional side, the substrate 60 is curved and arranged when viewed from the up-down directional side so as to cover substantially the entire disposition region of the cover portion 50 (see FIG. 8). In the case of the embodiment, the substrate 60 is disposed so as to provide a gap between the substrate 60 and the mounting wall portion 28 by interposing a rib (not illustrated) which partially protrudes on a lower surface side of the mounting wall portion 28 (see FIG. 6). The substrate 60 is attached to the mounting wall portion 28 of the holding member 27 from a rear surface side by using screws (not illustrated in the figure) at both end sides in the longitudinal direction and near the center (see FIGS. 8 and 9).

As the visible light source forming the decorative main body portion, in the case of the embodiment, the visible light LED 61 capable of emitting a light rat of a predetermined color is used. A plurality of visible light LEDs 61 are arranged side by side substantially along the longitudinal direction on the rear surface side of the substrate 60. In the case of the embodiment, the visible light LEDs 61 are scattered at six locations in the longitudinal direction of the substrate 60 over substantially the entire region (see FIG. 8). Each visible light LED 61 is attached so as to be able to emit a visible light toward the outside (front) on the light guide body 63 side and its operation is controlled by an operation circuit (not illustrated).

As illustrated in FIG. 6, the light guide body 63 forming the decorative main body portion is disposed in front (outside) of the substrate 60. The light guide body 63 is arranged so as to be curved when viewed from the up-down directional side so as to cover substantially the entire disposition region of the substrate 60 (see FIG. 8). That is, the light guide body 63 has a long substantially plate shape curved so as to substantially follow the light bar unit 25. Specifically, the light guide body 63 is bent so as to extend upward while extending forward from the front side of the visible light LED 61 and has a plate shape having a substantially L-shaped cross section. The light guide body 63 is configured such that the insertion hole 29 formed in the mounting wall portion 28 of the holding member 27 is inserted so that the upper end is located in the vicinity of the upper wall portion 51 of the cover portion 50 (see FIG. 6). The light guide body 63 is for emitting a visible light emitted from the visible light LED 61 upward from the upper end side to the radiation opening 27a side (cover portion 50 side) while internally deflecting the visible light. The light guide body 63 is formed of a synthetic resin such as a polycarbonate resin or an acrylic resin. In the case of the embodiment, the light guide body 63 is restricted in position on both end sides in the longitudinal direction by using protrusions (not illustrated) protruding from the substrate 60 and is supported by a protrusion portion (not illustrated) formed so that a lower end surface partially protrudes upward from the upper surface 19a of the light bar side part 19. In the disposition region of the light guide body 63, as described above, on the front edge (outer edge) side (outer edge 25a side of the light bar unit 25) of the mounting wall portion 28, the central fitting protrusion portion 40C (separation side mounting fitting portion) is arranged. In other words, the light guide body 63 is arranged in the disposition region of the central fitting protrusion portion 40C.

Figure 3:
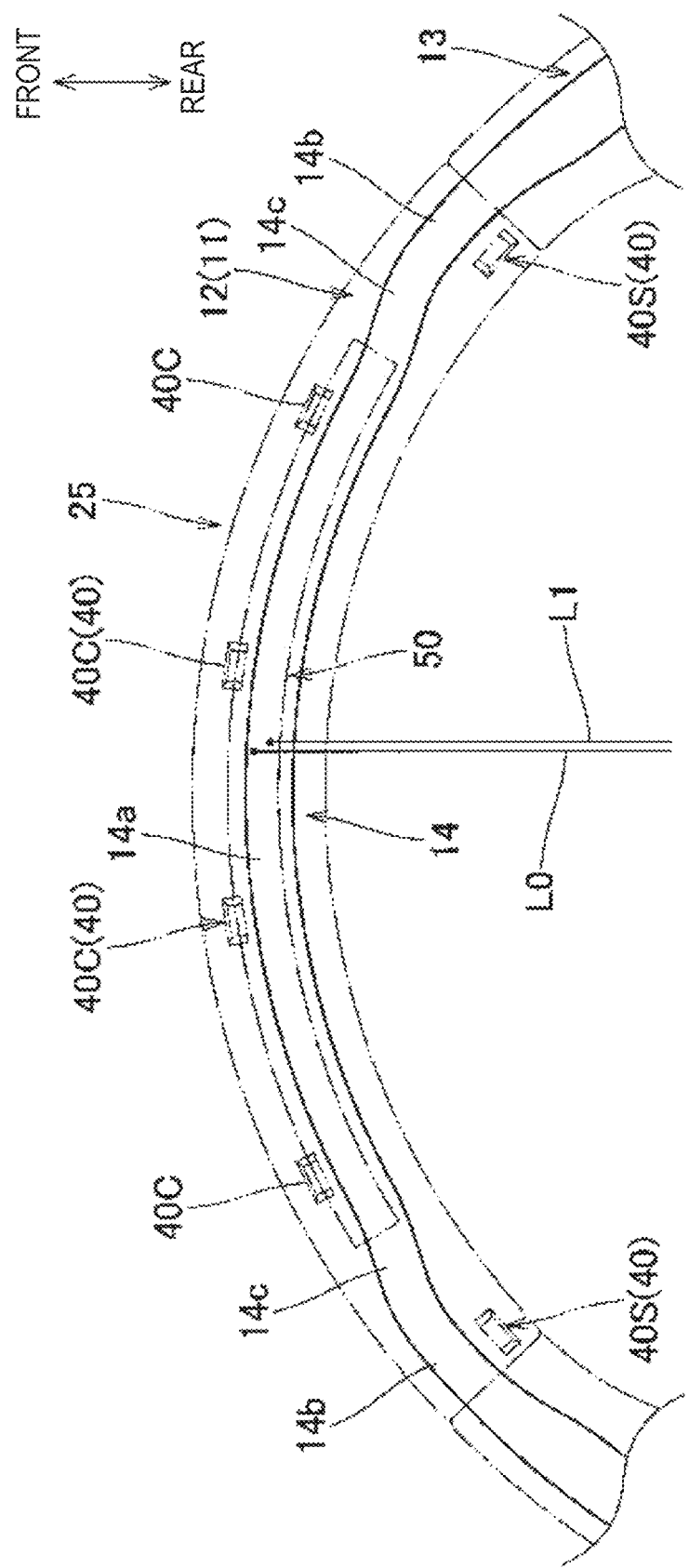
FIG. 3 is a partially enlarged plan view illustrating a front side part of a ring portion core metal in the steering wheel of the embodiment.
Figure 4:
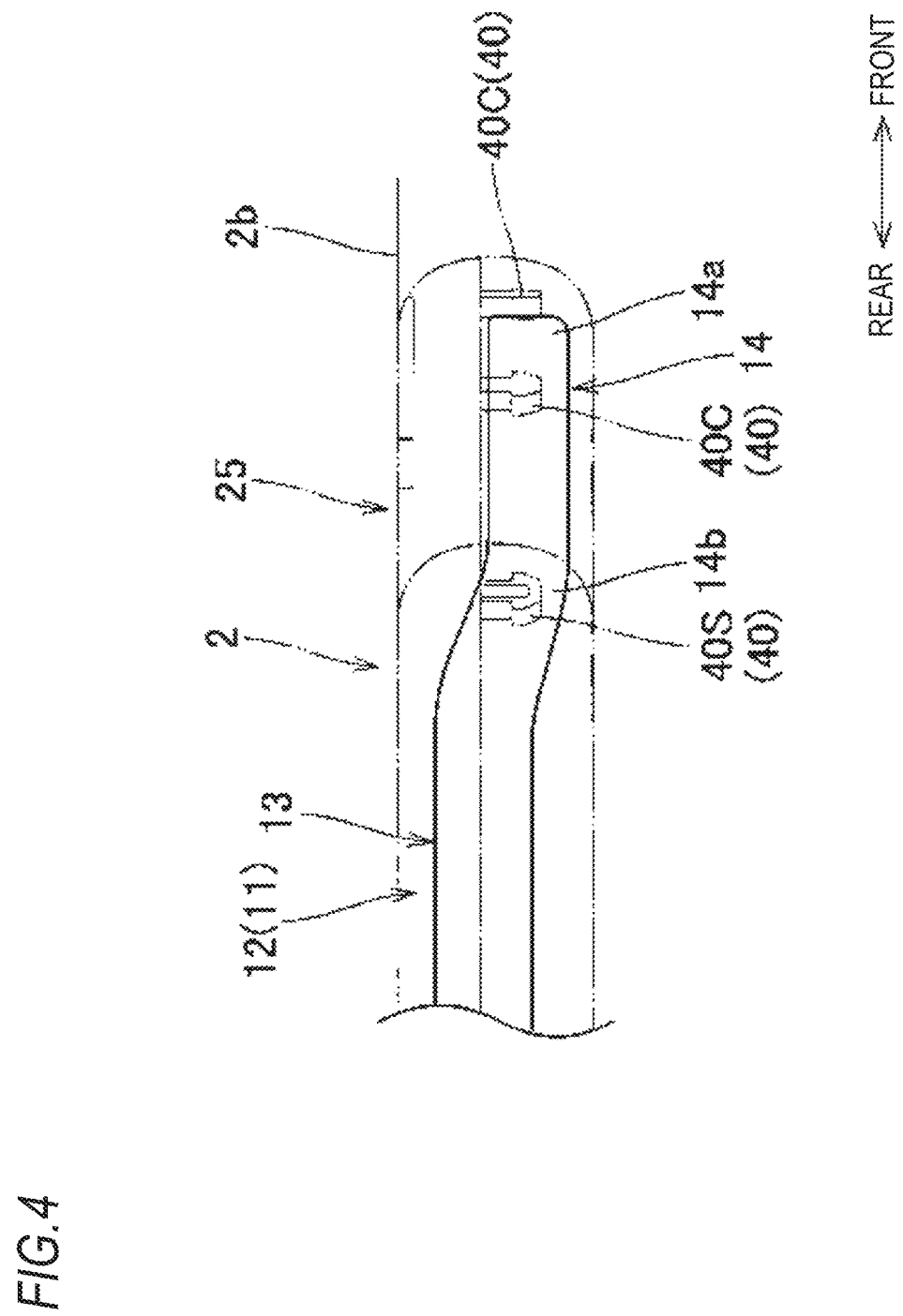
FIG. 4 is a partially enlarged side view illustrating the front side part of the ring portion core metal of FIG. 3.

In the steering wheel 1 of the embodiment, in the central region separated from the boss portion 4 and the spoke portions 3L and 3R, the fitting protrusion portion 40 (mounting fitting portion) which attaches the holding member 27 (mounting portion) in the light bar unit 25 (decorative body) to the light bar side part 19 of the coating layer 17 is formed, in the cross section of the ring portion 2 as the grip portion, on the front side (outside), which is the side separated from the boss portion 4 with respect to a core material (the central part 14a of the light bar arrangement portion 14 in the ring portion core metal 12) for the grip portion (see FIG. 6). Therefore, in the region where the central fitting protrusion portion 40C is disposed, in the cross section of the ring portion 2, the central part 14a of the light bar arrangement portion 14 can be arranged on the rear side (inside), which is the side relatively close to the boss portion 4. That is, in the steering wheel 1 of the embodiment, in the region separated from the boss portion 4 and the spoke portions 3L and 3R in the ring portion 2, a separation distance between the central part 14a (core material for the grip portion) and the boss portion core metal 11a (core material for the boss portion) arranged on the boss portion 4 side can be relatively shortened (specifically, as illustrated in FIG. 3, a separation distance L1 between a center before and after the central part 14a and the boss portion core metal 11a is set to be smaller than a distance L0 between a front-rear center (substantially coincide with a front-rear center of the cover portion 50) of the core metal when the center is aligned with the center of the ring portion as in the general portion 13 and the boss portion core metal 11a). In other words, in the steering wheel 1 of the embodiment, in the light bar arrangement portion 14 of the ring portion core metal 12, since the region (central part 14a) separated from the boss portion 4 and the spoke portions 3L and 3R can be brought closer to the boss portion 4 side, a value of the maximum bending moment which affects the strength and rigidity of the steering wheel 1 can be reduced. Therefore, the strength and rigidity of the core metal 11 (core material) can be improved. In the steering wheel 1 of the embodiment, even when a cross-sectional area of the central part 14a (light bar arrangement portion 14) is set to be smaller than that of the general portion 13 in the ring portion core metal 12 by a disposing space of the fitting protrusion portion 40 (see FIGS. 5 to 7), this does not cause a decrease in the strength of the light bar arrangement portion 14.

Therefore, in the steering wheel 1 of the embodiment, it is possible to suppress a decrease in the strength of the ring portion core metal 12 (the core material for the grip portion, in detail, the light bar arrangement portion 14) disposed at the part of the ring portion 2 (grip portion) on which the light bar unit 25 (decorative body) is arranged.

Figure 2:
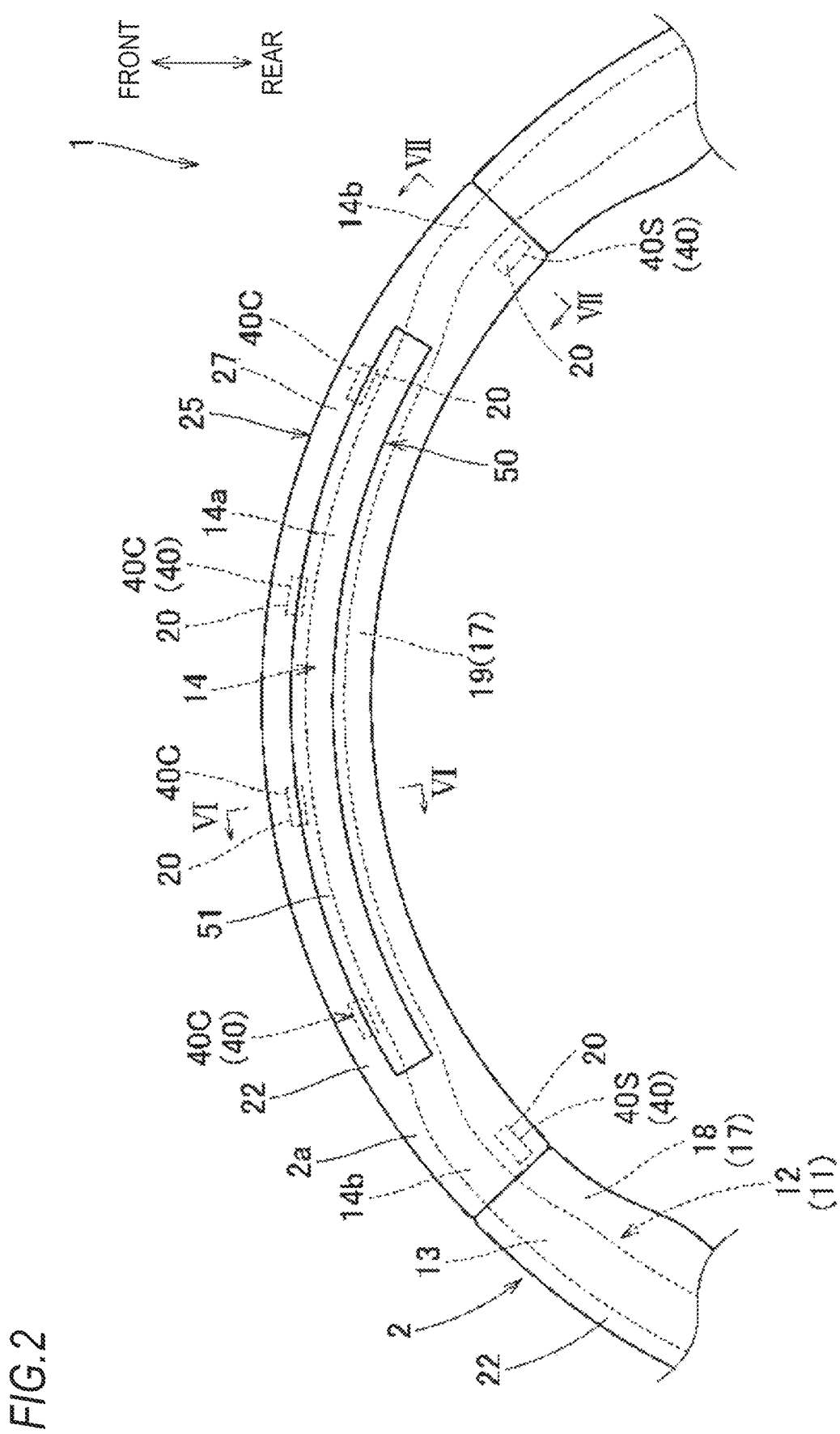
FIG. 2 is a partially enlarged plan view illustrating a front side part of a ring portion on which a light bar unit is arranged in the steering wheel of the embodiment.

Further, in the steering wheel 1 of the embodiment, in the fitting protrusion portion 40, the spoke side fitting protrusion portions 40S, which are arranged near (on both left and right end sides of the light bar unit 25) the spoke portions 3L and 3R, are formed, in the cross section of the ring portion 2, on the rear side (inside), which is the side close to the boss portion 4 with respect to the end side part 14b of the light bar arrangement portion 14 (see FIG. 7). That is, in the steering wheel 1 of the embodiment, as illustrated in FIGS. 2 and 3, by a plurality of fitting protrusion portions 40 (the central fitting protrusion portion 40C and the spoke side fitting protrusion portion 40S) disposed on both the inside and outside of the light bar arrangement portion 14, the holding member 27 of the light bar unit 25 can be attached to the light bar side part 19 of the coating layer 17 from both the inside and outside of the light bar arrangement portion 14 so as to straddle the light bar arrangement portion 14 in the ring portion core metal 12. Therefore, the holding member 27 can stably attach the light bar unit 25 to the light bar side part 19 of the coating layer 17. Further, in the steering wheel 1 of the embodiment, on the side close to the spoke portions 3L and 3R, the light bar arrangement portion 14 has a configuration in which the end side parts 14b are disposed on the sides (front sides) away from the boss portion 4. However, since the end side parts 14b are close to the spoke portions 3L and 3R, there is no effect on the value of the maximum bending moment, and thus it is difficult to reduce the strength and rigidity of the core metal 11.

When such a point is not taken into consideration, all the fitting protrusion portions may be arranged on the front edge side (the side separated from the boss portion) of the holding member 27. In the embodiment, as the mounting fitting portion, the holding member 27 as the mounting portion is formed with the fitting protrusion portion 40 protruding downward from the mounting wall portion 28 and this fitting protrusion portion 40 is fitted to the fitting recess portion 20 formed in the light bar side part 19 in the coating layer 17. However, the holding member (mounting portion) 27 may be configured to have a fitting recess portion for fitting a protruding fitting body provided on the coating layer side as the mounting fitting portion.

Specifically, in the steering wheel 1 of the embodiment, the light bar unit 25 capable of emitting a light ray during operation is disposed as the decorative body arranged in the ring portion 2 as the grip portion and the light bar unit 25 is arranged as a substantially long shape curved so as to substantially follow the annular ring portion 2. In the steering wheel 1 of the embodiment, in the fitting protrusion portion 40 (mounting fitting portion), a plurality (four in the case of the embodiment) of central fitting protrusion portions 40C as the separation side mounting fitting portions arranged on the side separated from the boss portion 4 and the spoke portion 3L, 3R. are arranged along the longitudinal direction of the light bar unit 25. Further, the light guide body 63 is a long substantially plate-like body curved so as to substantially follow the light bar unit 25 and is arranged in the disposition region of the central fitting protrusion portion 40C.

Therefore, in the steering wheel 1 of the embodiment, the outer edge 25a side of the light bar unit 25 formed by being curved in a substantially arc shape is attached to the coating layer 17 (light bar side part 19) by the central fitting protrusion portion 40C. Therefore, compared to the case where only an inner edge side of the light bar unit 25 is attached to the coating layer, it is possible to suppress the floating of the whole including the outer edge 25a side and stably attach the outer edge 25a side to the coating layer 17 (light bar side part 19). Further, in the steering wheel 1 having such a configuration, the light guide body 63 is a long substantially plate-like body curved so as to substantially follow the light bar unit 25. However, this light guide body 63 is located in the vicinity of the central part 14a (the core material for the grip portion) of the light bar arrangement portion 14 in the ring portion core metal 12 arranged on the side relatively close to the boss portion 4. Therefore, even when an impact force which presses a part of the ring portion 2 acts on the steering wheel 1, it is possible to prevent the light bar unit 25 from floating and it is also possible to prevent the light guide body 63 from cracking.

Figure 17:
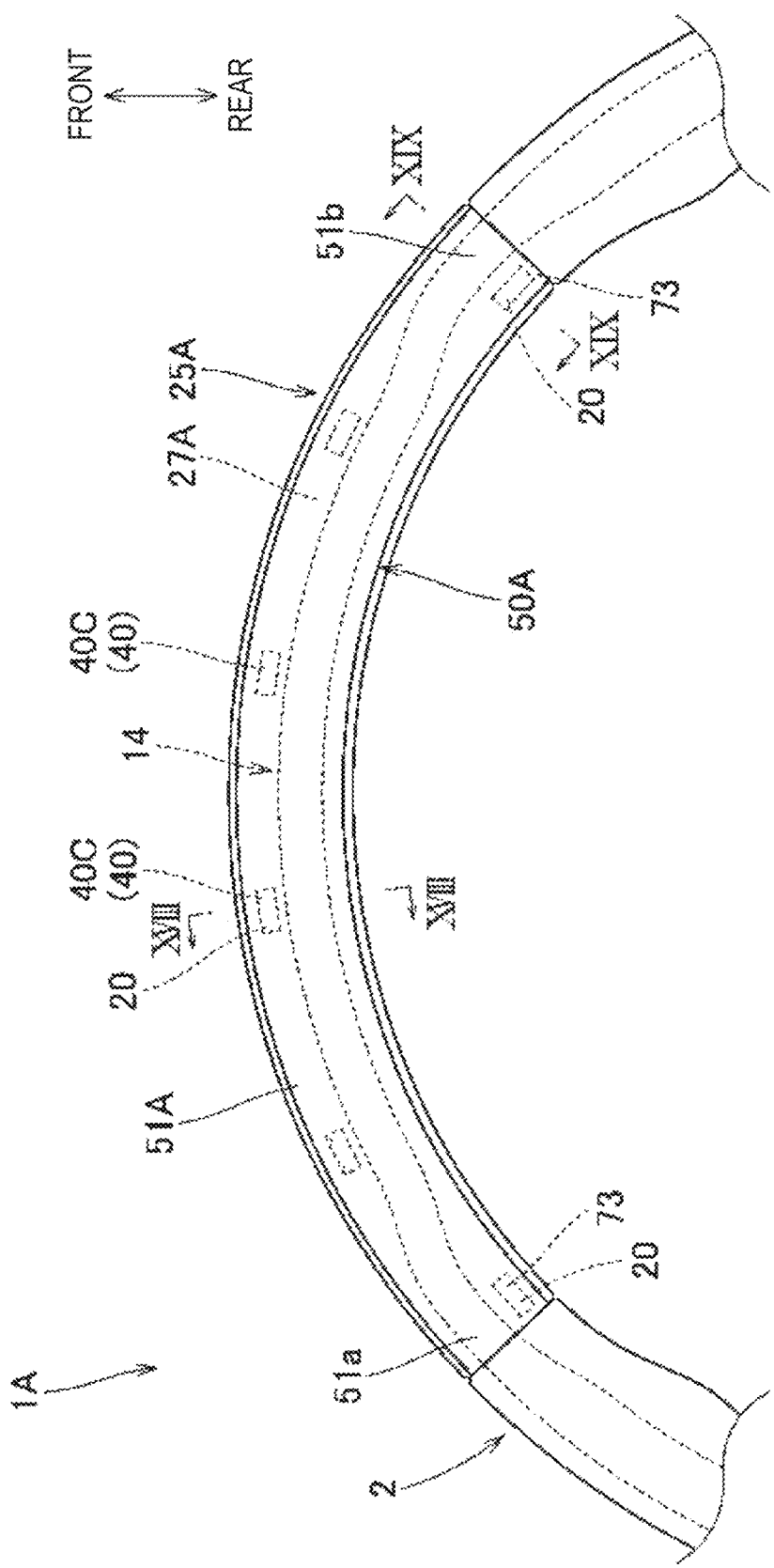
FIG. 17 is a partially enlarged plan view illustrating a front side part of a ring portion in which a light bar unit is arranged in a steering wheel according to another embodiment of the present invention.
Figure 18:
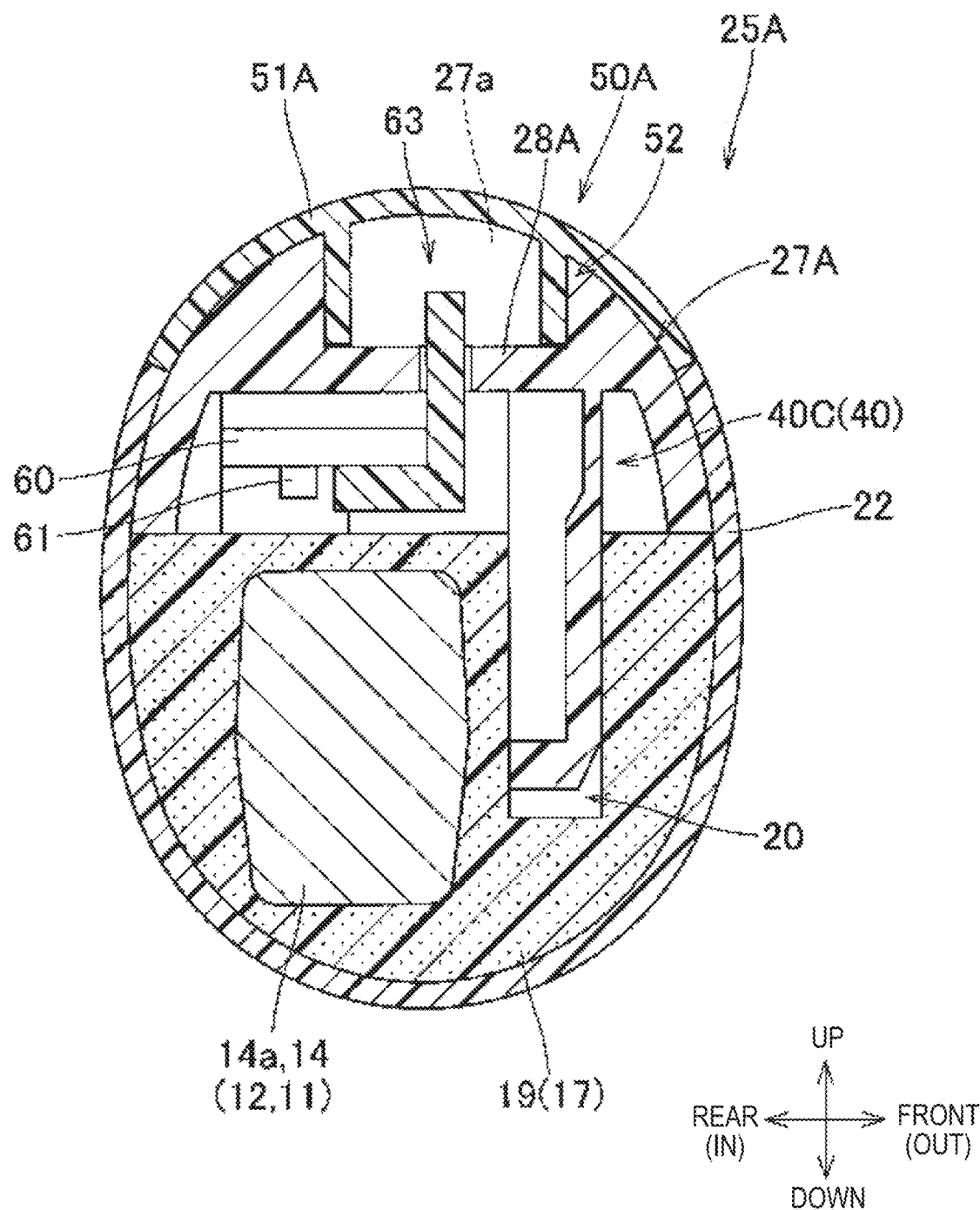
FIG. 18 is a cross-sectional view of the steering wheel of FIG. 17, which corresponds to the XVIII-XVIII part of FIG. 17.
Figure 19:
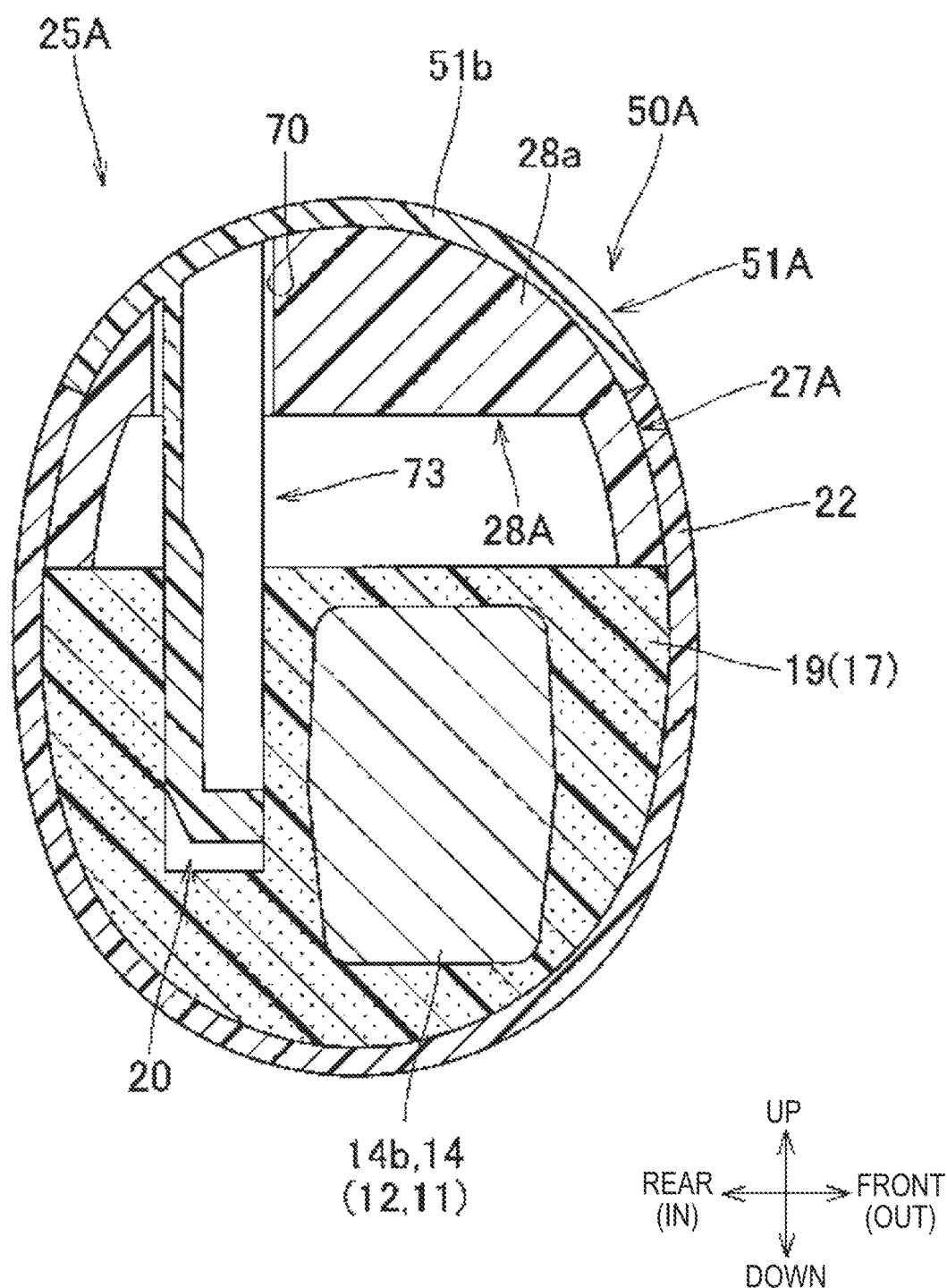
FIG. 19 is a cross-sectional view of the steering wheel of FIG. 17, which corresponds to the XIX-XIX part of FIG. 17.

Further, as a steering wheel 1A, one having a configuration as illustrated in FIGS. 17 to 19 may be used. In the steering wheel 1A, the members other than a light bar unit 25A arranged in the ring portion 2 have the same configuration as those of the steering wheel 1 described above, and the same members are designated by the same reference numerals and letters and detailed description thereof will be omitted.

The light bar unit 25A arranged in the ring portion 2 is arranged so as to be exposed on the upper surface side of the front side part 2a in the ring portion 2 in the same manner as the light bar unit 25 in the steering wheel 1 described above. In the light bar unit 25A, the members other than a holding member 27A and a cover portion 50A have the same configuration as those of the light bar unit 25 of the steering wheel 1 described above, and the same members are designated by the same reference numerals letters and detailed description thereof will be omitted.

The holding member 27A has a configuration in which only the central fitting protrusion portion 40C is provided as the fitting protrusion portion 40 (mounting fitting portion). In the holding member 27 in the steering wheel 1 described above, in the end side part 28a of the mounting wall portion 28A where the spoke side fitting protrusion portion is disposed, a through hole 70, which is formed in the cover portion 50A and can penetrate downward through the fitting protrusion portion 73 described below, is formed by penetrating in the up-down direction (see FIG. 19).

The cover portion 50A is configured to be wide so that the upper wall portion 51A covering the radiation opening 27a of the holding member 27A extends further on the outer side in the front-rear direction than the peripheral wall portion 52A so as to, compared with the upper wall portion 51 in the cover portion 50 described above, widely cover the upper surface side of the ring portion 2 in the front-rear direction (see FIG. 18). Also, the length dimension of the cover portion 50A along the circumferential direction of the ring portion is set to be larger than that of the upper wall portion 51 described above (see FIG. 17). Also, the cover portion 50A is configured to cover the upper surface side of the holding member 27A over substantially the entire surface in the directional side along the circumferential direction of the ring portion. Then, at positions near the rear edge (inner edge) on longitudinal end portions 51a and 51b of the upper wall portion 51A, as illustrated in FIG. 19, the fitting protrusion portions 73 (cover side fitting protrusion portion) are formed so as to protrude downward. The fitting protrusion portion 73 is arranged at a position substantially the same as the disposition position of the spoke side fitting protrusion portion in the holding member 27 of the steering wheel 1 described above. In the case of the embodiment, the fitting protrusion portion 73 is formed so as to penetrate the mounting wall portion 28A (holding member 27A) and protrude downward through the through hole 70 formed in the mounting wall portion 28A of the holding member 27A. The fitting protrusion portion 73 is configured to be fitted to the fitting recess portion 20 formed on the light bar side part 19 of the coating layer 17, similarly to the spoke side fitting protrusion portion 40S in the steering wheel 1 described above. Although detailed illustration is omitted, the fitting protrusion portion 73 is configured so that an outer shape of a region protruding downward from the mounting wall portion 28A is substantially the same as a spoke side fitting protrusion portion 40S in the steering wheel 1 described above.

In the steering wheel 1A with such a configuration, the light bar unit 25A is attached to the coating layer 17 not only by the fitting protrusion portion 40 (mounting fitting portion) extending from the holding member 27A (mounting portion), but also by the fitting protrusion portion 73 (cover portion side mounting fitting portion) protruding downward from the cover portion 50A as the decorative main body portion. Therefore, the mounting strength to the coating layer 17 is improved, and even when an impact force acts on the light bar unit 25A, the light bar unit 25A is prevented from coming off from the coating layer 17. In the embodiment, the fitting protrusion portion 73 as the cover portion side mounting fitting portion is arranged in the region on the end side near the spoke portion in the cover portion. However, at least a part of the separated side mounting fitting portions arranged on the side separated from the boss portion and the spoke portion may be configured to protrude from the cover portion as the cover portion side mounting fitting portion. Further, in the embodiment, the fitting protrusion portion 73 is formed in the disposition region of the holding member 27A as the mounting portion and is configured to penetrate the holding member 27A. However, the fitting protrusion portion may be configured to be arranged in a region where the mounting portion is not disposed. However, in the configuration in which the fitting protrusion portion 73 penetrates through the holding member 27A as in the embodiment, the fitting protrusion portion 73 regulates the position of the holding member 27A, so that the deviation of the holding member 27A with respect to the coating layer 17 in a cross-sectional circumferential direction of the ring portion 2 can also be suppressed.

In the embodiment, as the steering wheel, the steering wheels 1 and 1A having the annular ring portion 2 as the grip portion are taken as an example and described. However, the steering wheel to which the invention can be applied is not limited to the embodiment. For example, the invention can be applied to a steering wheel or the like having a rod-shaped grip portion substantially along the front-rear direction so as to extend back and forth from the spoke portion on the left and right sides of the boss portion. Further, in the steering wheels 1 and 1A of the embodiment, the light bar units 25 and 25A are provided as the decorative body. However, as the decorative body, a decorative garnish or the like which is exposed on a surface of the ring portion (grip portion) can be exemplified.

What is claimed is:

1. A steering wheel for a vehicle, comprising:
   a boss portion connected to a rotation shaft;
   a grip portion;
   a spoke portion connecting the boss portion to the grip portion;
   wherein a portion of the grip portion includes:
      a metal core material with a coating layer covering and contacting an outer peripheral surface of the metal core material, the coating layer including a first plurality of recesses and a second plurality of recesses;
      a light bar unit comprising a cover portion exposed on an upper surface side of the portion of the grip portion and a mounting portion;
      a first plurality of mounting fitting portions extending from the mounting portion and inserted into and received by the first plurality of recesses of the coating layer;
      a second plurality of mounting fitting portions extending from the cover portion, through the mounting portion, and inserted into and received by the second plurality of recesses of the coating layer.

2. The steering wheel according to claim 1, wherein the light bar unit further comprises:
   a substrate attached to a lower surface of the mounting portion;
   a LED attached to the substrate;
   a light guide body.

3. The steering wheel according to claim 1, wherein:
   the second plurality of recesses are disposed at circumferential ends of the portion of the grip portion;
   the first plurality of recesses are disposed circumferentially between the circumferential ends of the portion of the grip portion.

4. The steering wheel according to claim 3, wherein:
   the metal core material of the portion of the grip portion includes a bent portion disposed circumferentially between each of the circumferential ends of the portion of the grip portion and the first plurality of recesses such that the metal core material transitions from having a center disposed on an exterior half of the portion of the portion of the grip portion at the circumferential ends of the portion of the grip portion to having a center disposed on an interior half of the portion of the grip portion.

5. A steering wheel for a vehicle, comprising:
   a boss portion connected to a rotation shaft;
   a grip portion;
   a spoke portion connecting the boss portion to the grip portion;
   a portion of the grip portion includes:
   circumferential ends;
      a metal core material with a coating layer covering and contacting an outer peripheral surface of the metal core material, the coating layer including a first plurality of recesses and a second plurality of recesses;
      a cover portion exposed on an upper surface side of the portion of the grip portion and a mounting portion;
      a first plurality of mounting fitting portions and a second plurality of mounting fitting portions extending from the mounting portion and inserted into and received by the first plurality of recesses and second plurality of recesses of the coating layer, respectively;

the metal core material includes a bent portion disposed circumferentially between each of the circumferential ends and the first plurality of recesses such that the metal core material transitions from having a center disposed on an exterior half of the portion of the portion of the grip portion at the circumferential ends of the portion of the grip portion to having a center disposed on an interior half of the portion of the grip portion, the exterior half disposed towards a front of the vehicle and the interior half disposed towards a rear of the vehicle.

6. The steering wheel according to claim 5, wherein the mounting portion further comprises:

a substrate;

a LED attached to the substrate;

a light guide body.

7. The steering wheel according to claim 5, wherein each of the first plurality of mounting fitting portions and the second plurality of mounting fitting portions includes a pedestal portion, neck portion, and head portion.

8. The steering wheel according to claim 7, wherein each of the first plurality of recesses and the second plurality of recesses includes a wide width portion, configured to receive the head portions of the first plurality of mounting fitting portions and the second plurality of mounting fitting portions, and a narrow width portion, configured to receive the neck portions of the first plurality of mounting fitting portions and the second plurality of mounting fitting portions.

9. The steering wheel according to claim 5, the mounting portion including a plurality of insertion holes configured to receive a plurality of locking pieces of the cover portion.

10. The steering wheel according to claim 9, the mounting portion including a plurality of protrusion portions extending into the plurality of insertion holes, the plurality of locking pieces including a plurality of locking holes, the plurality of protrusion portions configured to engage with the plurality of locking holes.

* * * * *